(12) United States Patent
Beckstrom et al.

(10) Patent No.: US 11,903,524 B2
(45) Date of Patent: Feb. 20, 2024

(54) MOTOR DRIVEN FOOD PROCESSING SYSTEM

(71) Applicant: CONAIR CORPORATION, Stamford, CT (US)

(72) Inventors: David William Beckstrom, Roxbury, CT (US); Jonathan Gerard Berera, Torrington, CT (US)

(73) Assignee: Conair LLC, Stamford, CT (US)

( * ) Notice: Subject to any disclaimer, the term of this patent is extended or adjusted under 35 U.S.C. 154(b) by 281 days.

(21) Appl. No.: 17/096,367

(22) Filed: Nov. 12, 2020

(65) Prior Publication Data

US 2022/0142409 A1 May 12, 2022

(51) Int. Cl.
*A47J 43/046* (2006.01)
*A47J 43/08* (2006.01)
*A47J 43/07* (2006.01)

(52) U.S. Cl.
CPC ......... *A47J 43/046* (2013.01); *A47J 43/0722* (2013.01); *A47J 43/085* (2013.01)

(58) Field of Classification Search
CPC ..... A47J 43/044; A47J 43/046; A47J 43/0722
See application file for complete search history.

(56) References Cited

U.S. PATENT DOCUMENTS

| | | | |
|---|---|---|---|
| 2,930,596 A | 3/1960 | Waters | |
| 3,250,518 A | 5/1966 | Van Rossem | |
| 3,313,332 A * | 4/1967 | Fritz | A47J 43/046 241/101.8 |
| 3,415,497 A | 12/1968 | Johnson | |
| RE27,002 E * | 12/1970 | Stephan et al. | B02C 18/06 241/89.4 |
| 4,100,613 A | 7/1978 | Shaeffer | |
| 5,383,613 A | 1/1995 | Sundquist | |
| 5,533,797 A | 7/1996 | Gelber | |
| 5,957,577 A * | 9/1999 | Dickson | A47J 43/07 366/347 |
| D424,865 S | 5/2000 | Crescenzi et al. | |
| 6,571,908 B2 | 6/2003 | Bohannon et al. | |
| D528,364 S | 9/2006 | Kolar et al. | |
| 8,087,603 B2 | 1/2012 | Kolar et al. | |

(Continued)

FOREIGN PATENT DOCUMENTS

| | | | | |
|---|---|---|---|---|
| CN | 103720354 A | * | 4/2014 | ............ A47J 27/004 |
| CN | 107334393 A | * | 11/2017 | ............. A47J 43/04 |

(Continued)

OTHER PUBLICATIONS

PCT International Search Report dated Feb. 2, 2022 from corresponding International Application No. PCT/US2021/057658 filed Nov. 2, 2021.

(Continued)

*Primary Examiner* — Katrina M Stransky
*Assistant Examiner* — P Derek Pressley
(74) *Attorney, Agent, or Firm* — Grogan, Tuccillo & Vanderleeden, LLP

(57) ABSTRACT

A food processing system includes a processing container having a motor-driven processing blade positioned at a bottom of the processing container, a lid receivable atop the processing container, and a motor-driven dasher assembly connected to the lid and being configured to scrape interior sidewalls of the processing container.

20 Claims, 36 Drawing Sheets

(56) References Cited

U.S. PATENT DOCUMENTS

| | | | |
|---|---|---|---|
| 9,681,778 B2 | 6/2017 | Pendleton et al. | |
| 9,770,133 B2 | 9/2017 | Dickson, Jr. et al. | |
| D838,538 S | 1/2019 | Carlson | |
| 10,357,131 B2 | 7/2019 | Dickson, Jr. et al. | |
| 10,357,749 B2 | 7/2019 | Fleming | |
| D883,021 S | 5/2020 | McConnell et al. | |
| 10,638,884 B2 | 5/2020 | Zakowski et al. | |
| 2014/0299701 A1 | 10/2014 | Zakowski | |

FOREIGN PATENT DOCUMENTS

| | | | | |
|---|---|---|---|---|
| CN | 209074344 | | 7/2019 | |
| CN | 209074344 U | | 7/2019 | |
| CN | 211324546 U | | 8/2020 | |
| CN | 111728506 A | | 10/2020 | |
| EP | 1430824 A1 | * | 6/2004 | ............ A47J 27/004 |
| EP | 3311717 A1 | * | 4/2018 | ............ A47J 43/044 |
| GB | 2465834 A | * | 6/2010 | ............ A47J 43/044 |

OTHER PUBLICATIONS

International Preliminary Report dated May 16, 2023 from corresponding International Application No. PCT/US2021/057658.

* cited by examiner

MOTOR DRIVEN FOOD PROCESSING SYSTEM

FIELD OF THE INVENTION

The present invention relates generally to food processing devices and, more particularly, to a motor-driven dasher or scraper device for a food processing device, and a sound enclosure for a food processing device.

BACKGROUND OF THE INVENTION

Food processing devices providing a number of different types of food processing operations such as blending, mixing, grinding, chopping, slicing, grating, shredding, and the like, are well known. Existing food processing devices typically include a base housing an electric motor, a drive shaft driven by the motor, a blending or processing jar receivable on the base and a lid or cover releasably mounted to the jar. A rotatably driven blade is mounted in the bottom of the jar and is engageable with the drive shaft so as to be driven by the motor to process one or more food items inside the jar.

While existing food processing devices are generally suitable for what is regarded as ordinary performance, there is room for improvement in terms of performance, functionality and noise level. In particular, a common occurrence with electric food processors, or blenders, is the noise generated when the food processor is running. The amount of noise generated by these devices is a result of both the blending taking place within the container of the blender, often involving the crushing of ice or other hard food items, as well as the noise vibrations that are generated by the electric motor of the blender. The noise levels generated by the food processor are particularly troublesome in commercial settings such as restaurants, food stands, and coffee shops, especially where the food processor is positioned near a customer service counter.

As is understood in the art, one of the key to making high quality products, be it shakes, dips, salsas, other beverages, or the like, is a high quality food processing device that will quickly and efficiently blend the ingredients to produce a product with uniform consistency. When processing thicker products, such as nut butters, hummus, shakes, smoothies, etc., traditional food processing devices may be somewhat difficult and time consuming to use because the product will often stick to the walls of the blending jar. The user must stop the blending machine, remove the lid from the blending jar, manually scrape the internal walls of the blending jar, return the lid to enclose the product within the blending jar, turn on the blending machine, and repeat those steps until the product is properly blended. The time and effort required to achieve a desired blend for the product increases with each additional sequence in which the user must remove the lid and manually scrape the product off the internal wall of the blending jar.

In view of the above, there is a need for a food processing device having an enclosure which is effective at significantly reducing noise levels created by operation of the device, as well as a motorized dasher or scraper assembly that can be utilized to scrape foodstuffs from the sides of the blender jar during processing, without necessitating cessation of the processing operation or removal of the blender jar lid.

SUMMARY OF THE INVENTION

It is an object of the present invention to provide a food processing system.

It is another object of the present invention to provide a food processing system having a sound enclosure for reducing noise levels created by operation of the system.

It is another object of the present invention to provide a food processing system that can be configured to automatically commence processing upon closure of the sound enclosure.

It is another object of the present invention to provide a food processing system having a motor driven dasher or scraper assembly for removing foodstuffs from the sidewalls of a blender jar during operation.

It is another object of the present invention to provide a food processing system having a dasher assembly that is configured to direct foodstuffs into the main processing blade.

It is another robject of the present invention to provide a food processing system having a motor driven dasher assembly that is operable even when a sound enclosure encloses the blender jar.

These and other objects are achieved by the present invention.

According to an embodiment of the invention, a food processing system includes a processing container having a motor-driven processing blade positioned at a bottom of the processing container, a lid receivable atop the processing container, and a motor-driven dasher assembly connected to the lid and being configured to scrape interior sidewalls of the processing container.

According to another embodiment of the invention, a food processing system includes a base having a motor having an output shaft rotatably driven by the motor, a processing container receivable atop the base and having a bottom mounted blade assembly configured for operative connection with the output shaft of the motor so as to be rotatable therewith, a lid receivable atop the processing container, a motor-driven dasher assembly connected to the lid. The dasher assembly includes a dasher having at least one scraper blade extending into the processing container adjacent to interior sidewalls of the processing container, and a motor having an output shaft drivingly connected to the dasher for rotating the at least one scraper blade with respect to the processing container.

According to another embodiment of the invention, a method for processing food items includes the steps of connecting a dasher assembly to a lid of a processing container, positioning the lid atop the processing container such that a scraping blade of the dasher assembly extends into the processing container, actuating a motor of the dasher assembly to rotate the scraping blade with respect to the processing container.

According to yet another embodiment of the invention, a sound enclosure system for a food processing device includes a first enclosure member configured to be secured to a base of the food processing device, a second enclosure member pivotally connected to the first enclosure member and moveable between an open position and a closed position, and at least one detection element associated with the second enclosure member, the detection element being configured to be detected by a controller of the food processing device so as to indicate to the controller that the second enclosure member is in the closed position.

According to yet another embodiment of the present invention, a food processing system includes a base having a motor, the base being configured to receiving a processing container thereon, and a dasher assembly having at least one scraper blade for scraping interior sidewalls of the processing container, and a motor assembly for rotating the scraper blade. The system further includes a sound enclosure mountable on the base, the sound enclosure including a first enclosure member configured to be secured to the base, and a second enclosure member pivotally connected to the first enclosure member and moveable between an open position and a closed position, wherein when the second enclosure member is in the closed position, the sound enclosure encases the processing container and the dasher assembly.

According to yet another embodiment of the invention, a sound enclosure system for a food processing device includes a first enclosure member configured to be secured to a base of the food processing device, a second enclosure member pivotally connected to the first enclosure member and moveable between an open position and a closed position, a gasket positioned along one of an outer peripheral edge of the first enclosure member or an inner peripheral edge of the second enclosure member and configured to provide a seal between the first enclosure member and the second enclosure member when the second enclosure member is in the closed position, and a pedestal receivable on a base of the food processing device, the pedestal being configured to receive lower edges of the first enclosure member and the second enclosure member. The pedestal is formed from a vibration dampening material.

According to yet another embodiment of the present invention, a method for processing food items includes the steps of placing a motor-driven dasher assembly atop a processing container, such that scraper blades of the dasher assembly are in close association with sidewalls of the processing container, placing processing container atop a base of a food processing device, positioning a sound enclosure in a position such that the sound enclosure encases the processing container and the dasher assembly, at the dasher assembly, detecting a closed position of the sound enclosure, and, in response to the detection of the closed position of the sound enclosure, actuating a motor of the dasher assembly to rotate the scraper blades.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
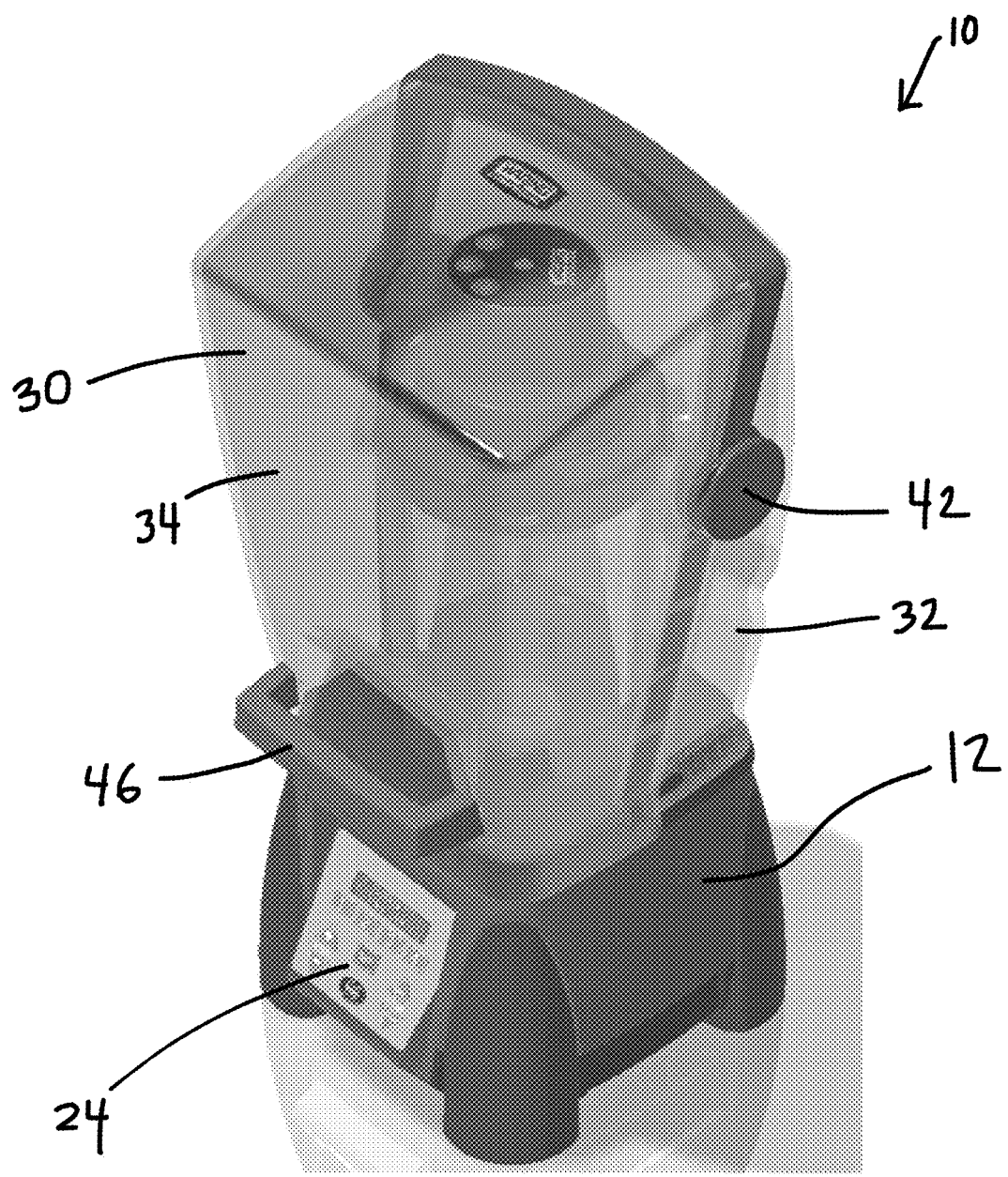
FIG. 1 is a front, perspective view of a food processing system/device according to an embodiment of the present invention.

With reference to FIGS. 1-5, a food processing system 10 (also referred to herein as food processing device 10)

according to an embodiment of the present invention is illustrated. As shown therein, the food processing device 10 includes a base 12 which houses a motor (not shown) drivingly connected a rotatable output shaft 14. The food processing device 10 further includes a processing container 16 having a set of rotating blades interior 18 to the processing container 16. The processing container 16 is receivable atop the base 12 such that a splined hub 20 of the processing container 16 (connected to the blades 18) matingly engages a correspondingly splined end of the rotatable output shaft 14, such that the blades 18 can be rotatably driven by the motor via the output shaft 14, as is known in the art. The motor may be powered by a connected electrical cord for connection to a standard outlet, however, an internal power supply (e.g., battery) may also be utilized to power the motor.

Base 12 includes a control interface 24 on one of its surfaces allowing for user control of processing operations. In particular, the control interface 24 can be utilized to turn on and off the food processing device 10, to adjust the speed of rotation of the motor, as well as control other operations of the food processing device 10 via a controller (not shown) contained within the base 12. Base 12 also includes a raised pedestal 26 on a top surface thereof, which is configured to be received in a base portion of the processing container 16 when the processing container is placed atop the base and engaged with the output shaft 14 of the motor. Pedestal 26 may include one or more pads 28 which, when received by the base portion of the container 16, prevent the container 16 from rotating when the motor within base 12 is actuated. In addition, pedestal 24 also receives the splined end of the rotating motor shaft 14 therethrough.

Figure 5:
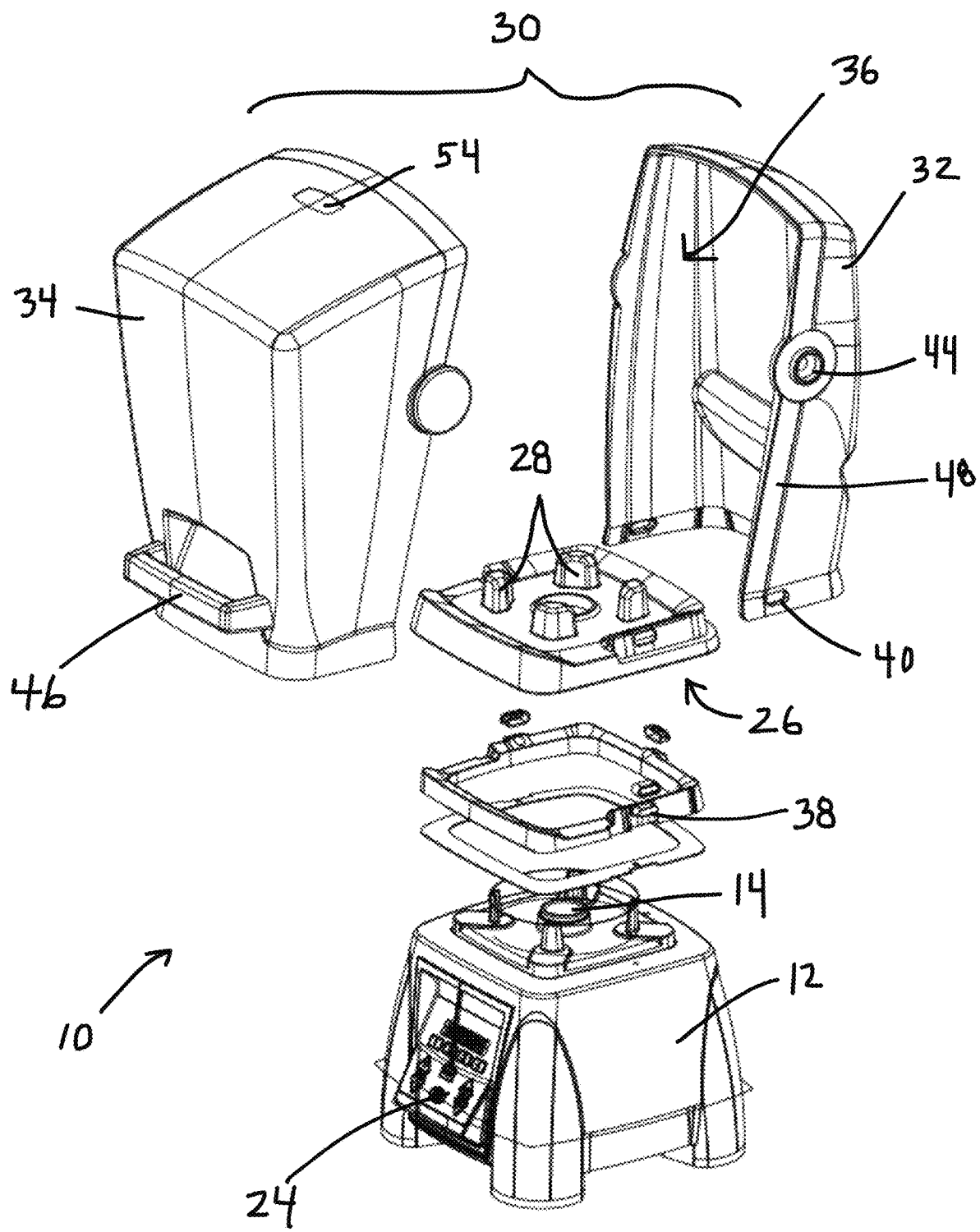
FIG. 5 is an exploded view of the food processing system of FIG. 1.

As best shown in FIGS. 1-5, the food processing device 10 includes a sound enclosure 30 attached to the base 12. With particular reference to FIG. 5, the sound enclosure 30 includes a rear enclosure member 32 forming a first half of a housing, and a front enclosure member 34 forming a second half of a housing, which together define an interior space 36 therebetween for accommodating the container 16. The rear enclosure member 32 is removably connected to the base 12 via a pair of projections 38 on the base 12 that are received in corresponding recesses or apertures 40 adjacent to the bottom edge of the rear enclosure member 32. In an embodiment, the projections extend through the pedestal 26, as best shown in FIG. 5. Importantly, the pedestal 26 is formed from a resilient material such as rubber. The pedestal 24 serves as a vibration dampening mechanism to reduce the vibrations transferred from base 12 to enclosure 30, reducing the noise created by the food processing device 10. Other attachment mechanisms for attaching the rear housing 34 to the base 12, such as a tongue and groove attachment, fasteners including thumb screws, magnetic means, and the like may also be utilized without departing from the broader aspects of the invention. In addition, it is contemplated that the rear enclosure member 32 may be fixedly (i.e., not removably) attached to the base 12.

The front enclosure member 34 is pivotally connected to the rear enclosure member 32 at a pair of opposed pivot points 42. For example, in an embodiment, the rear enclosure may have a pair of opposed, outwardly projecting lugs 44 or axles that are received in corresponding recesses or sockets (not shown) in the inward facing edges of the front enclosure member 34. The front enclosure member 34 also includes a handle 46 located adjacent to a bottom edge of the front enclosure member 34 for rotating the front enclosure member 34 between a closed position, shown in FIGS. 1 and 3, and an open position, shown in FIG. 2 (providing access to the interior space 36 for insertion and removal of the container 16 from the base 12). The front cover member 34, however, may be pivotally connected to rear enclosure member 32 by any means known in the art, such that it can be moved from a closed position to an open position, allowing access to the interior of enclosure 30 for insertion and/or removal of the container 16.

Figure 2:
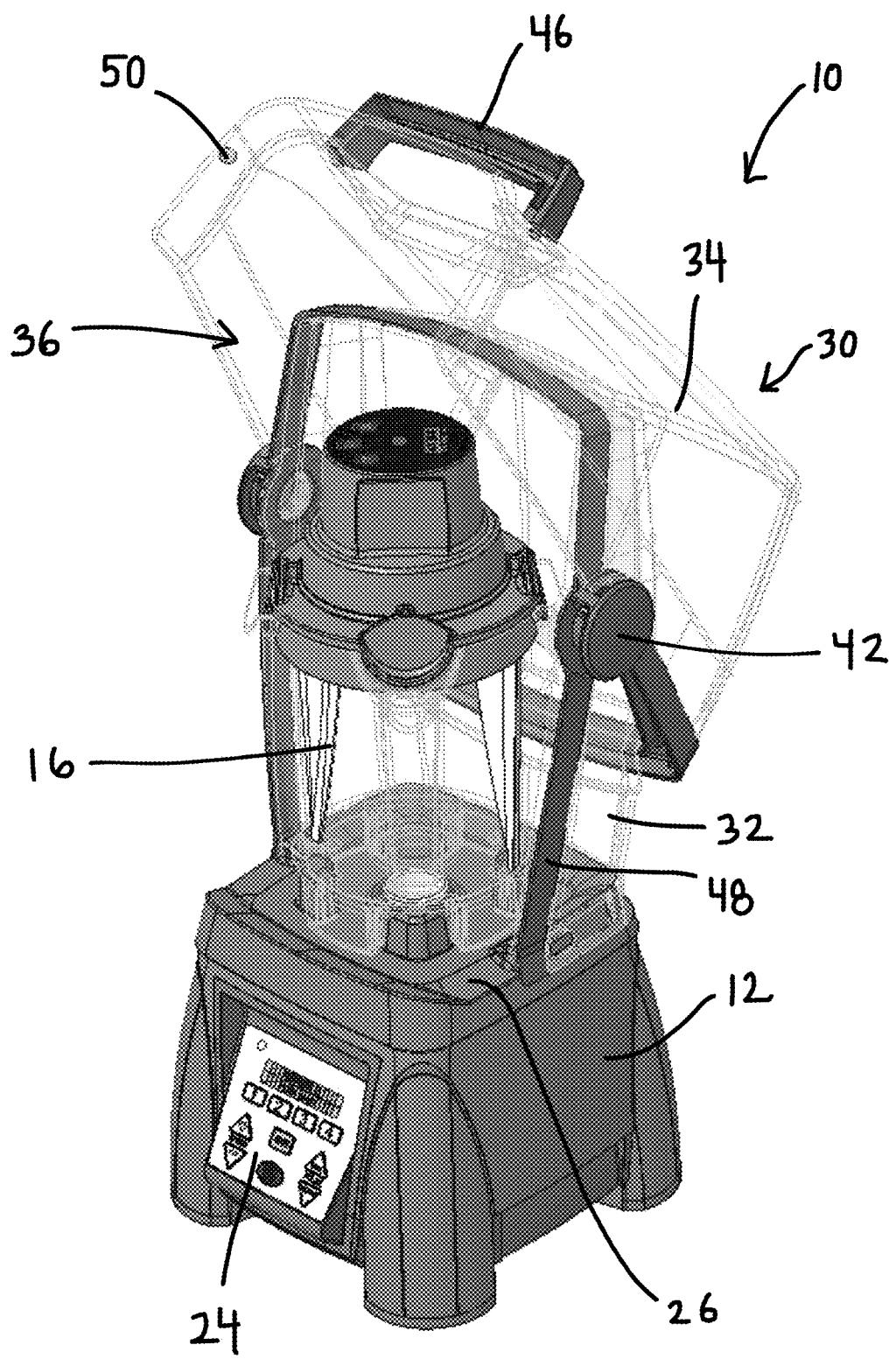
FIG. 2 is a perspective view of the food processing system of FIG. 1, showing a sound enclosure in an open position.
Figure 3:
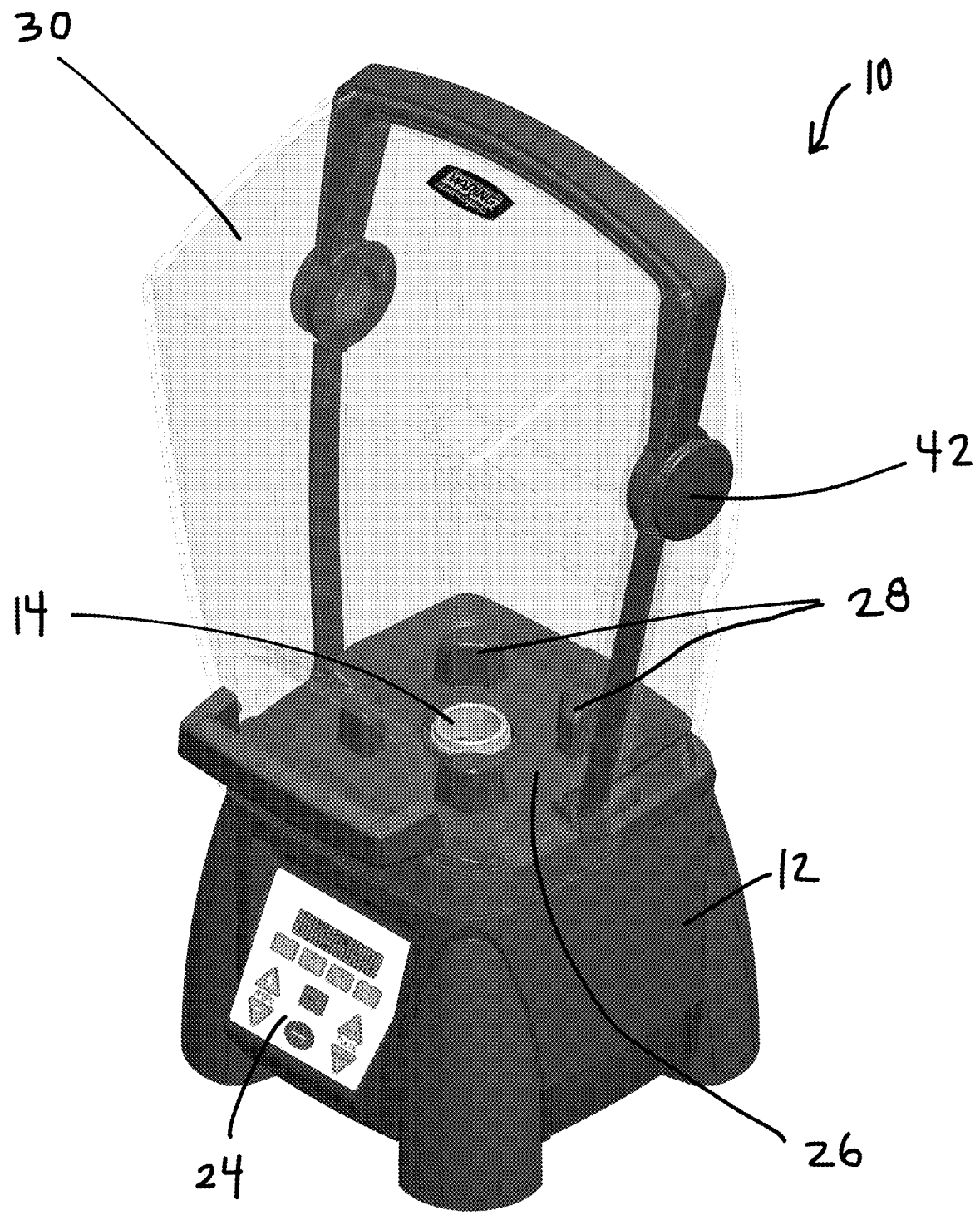
FIG. 3 is a perspective view of the food processing system of FIG. 1, showing the sound enclosure in an open position.
Figure 4:
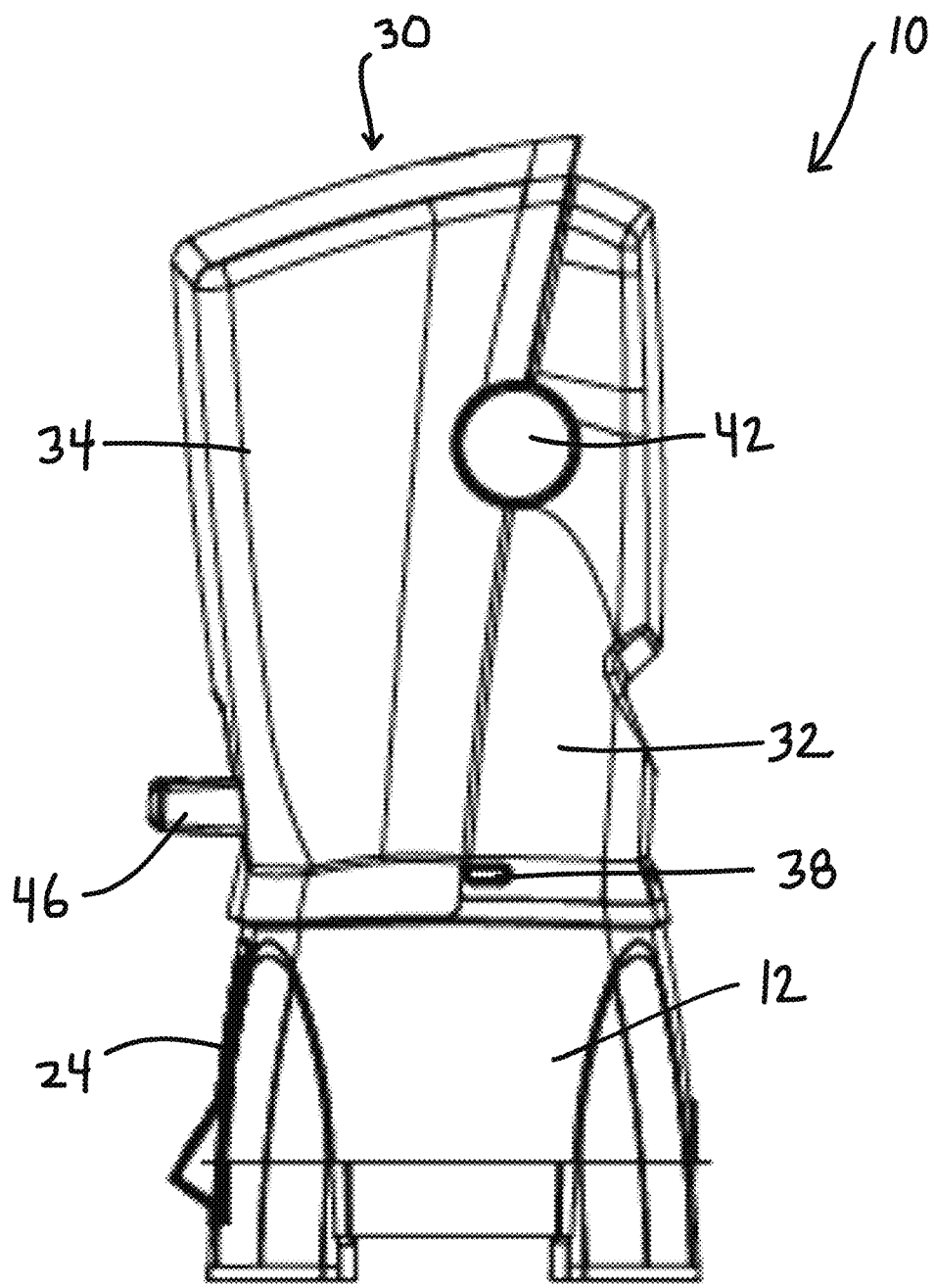
FIG. 4 is a side elevational view of the food processing system of FIG. 1.

With reference to FIG. 2, a gasket 48 may be fitted over a peripheral edge of at least one of the cover members 32, 34 (shown in FIG. 2 as being fitted over a peripheral edge of the rear cover member 32). Gasket 48 is preferably a single integral piece that is molded to fit snuggly over the rear enclosure member 32 and may be secured to body portion 18 by any method known to those skilled in the art, including, for example, by providing an adhesive between gasket 48 and the rear enclosure member 32. Gasket 48 may be made of any material capable of providing a sound and vibration dampening seal against the front enclosure member 34, such as, for example, a thermoplastic elastomer. Gasket 48 provides a sealing surface for the front enclosure member 34 of the sound enclosure 30. When front enclosure member 34 is in a closed position, the interior sidewalls of the cover member contact the gasket 48, thereby creating a seal therebetween against noise generated within enclosure 10. As illustrated, the gasket 38 is positioned around the entire peripheral edge of the rear enclosure member 32, providing a complete seal for the enclosure 30 when front enclosure member 34 is in the closed position so that no surface of the front enclosure member 34 directly contacts rear enclosure member 32. This significantly reduces the amount of vibration transferred between the front enclosure member 34 and the rear enclosure member 32, and also provides a much improved sound barrier against noises created by the blending occurring within sound enclosure 30.

It is contemplated that the enclosure 30 may be made of any material known in the art, however, it is preferred that the rear enclosure member 32 and front enclosure member 34 are may of a transparent or translucent material such as, for example, thermoplastic or polycarbonate, so that the container 16 can be viewed when positioned on the base 12 with the front enclosure member 34 in the closed position.

Figure 6:
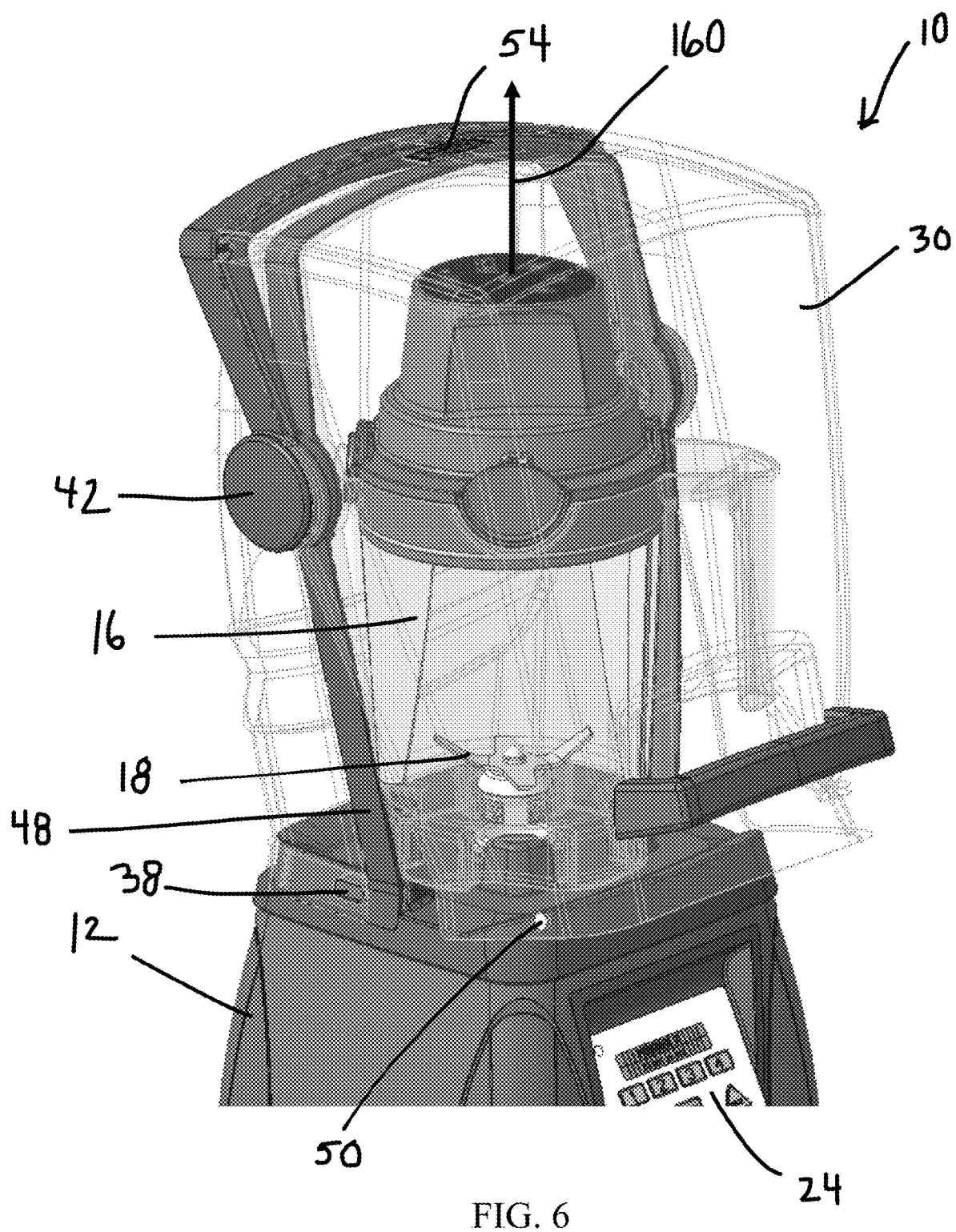
FIG. 6 is a perspective view of the food processing system of FIG. 1, showing operation of an interlock system.
Figure 7:
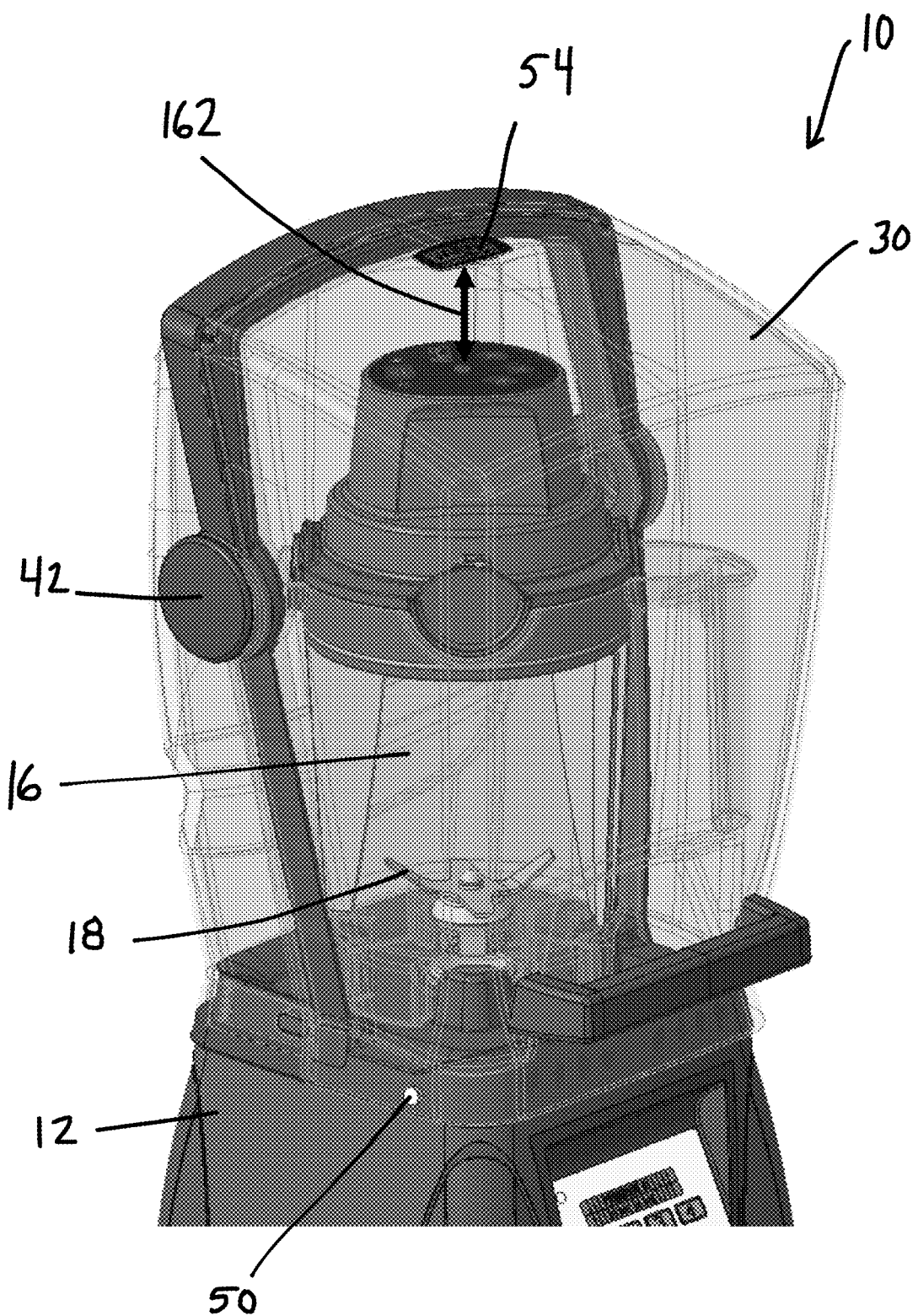
FIG. 7 is another perspective view of the food processing system of FIG. 1, showing operation of the interlock system.
Figure 8:
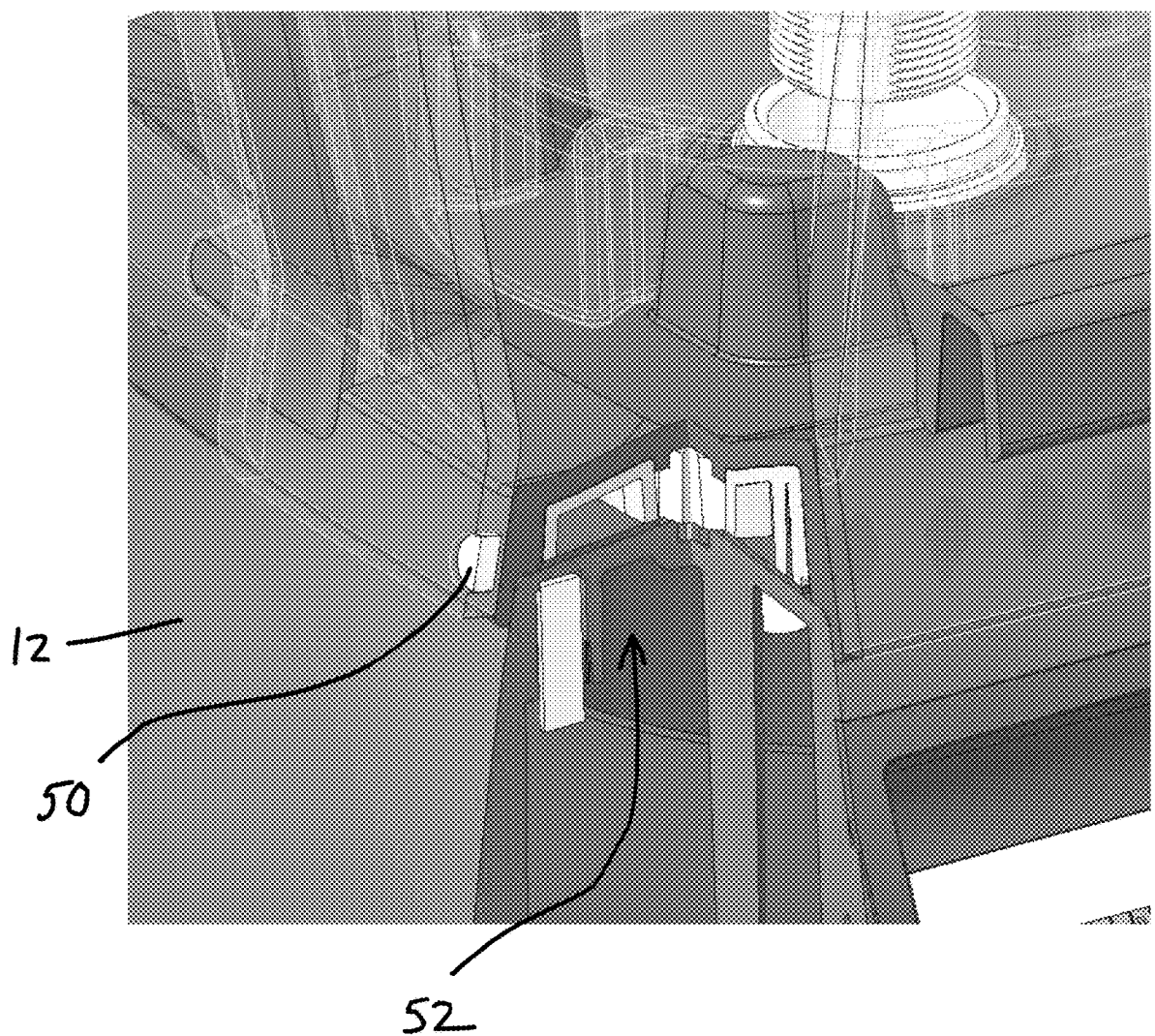
FIG. 8 is an enlarged, detail perspective view showing the interlock system.

Turning now to FIGS. 6-8, the sound enclosure 30 has a number of features that facilitate and allow for automatic processing and manipulation of the food items contained within the blending container 16 within the enclosure 30 while the front enclosure member 34 is in the closed position. In particular, in an embodiment, the front enclosure member 24 includes a magnet 50 located adjacent to a bottom edge thereof. The magnet 50 is configured to actuate a reed switch 52 located interior to the base when the magnet 50 is brought into close proximity to the reed switch (which occurs when the front enclosure member 34 is in the closed position). When the sound enclosure 30 is opened, the magnet 50 is no longer in close proximity to the switch 52; thus, the switch opens and stops the motor. In addition to stopping the motor when the enclosure 30 is opened, the food processing device 10 is also configured such that when the enclosure 30 is closed, the magnet 50 closes the reed switch 52 and the motor starts automatically.

In particular, in an embodiment, the interface 24 may include an auto start button that, when actuated, prompts the controller to automatically start the motor to rotate the blades 18 when closure of the front enclosure member 34 is detected by the reed switch 52. In an embodiment, when the auto start feature is enabled, an operator may select one or more preprogrammed processing modes and/or durations that are carried out automatically by the controller of the device 10 when the enclosure 30 is in the closed position. While FIGS. 6-8 illustrate the use of a reed switch in communication with the controller to detect the position of the enclosure 30 (i.e., open or closed), it is contemplated that other switches or sensors may also be utilized to accomplish similar functions, such as a mechanical contact switch, pressure switch, or the like.

As also shown in FIGS. 6-8, an underside surface of front enclosure member 34 has an optically reflective element 54, the purpose of which are discussed hereinafter.

Figure 9:
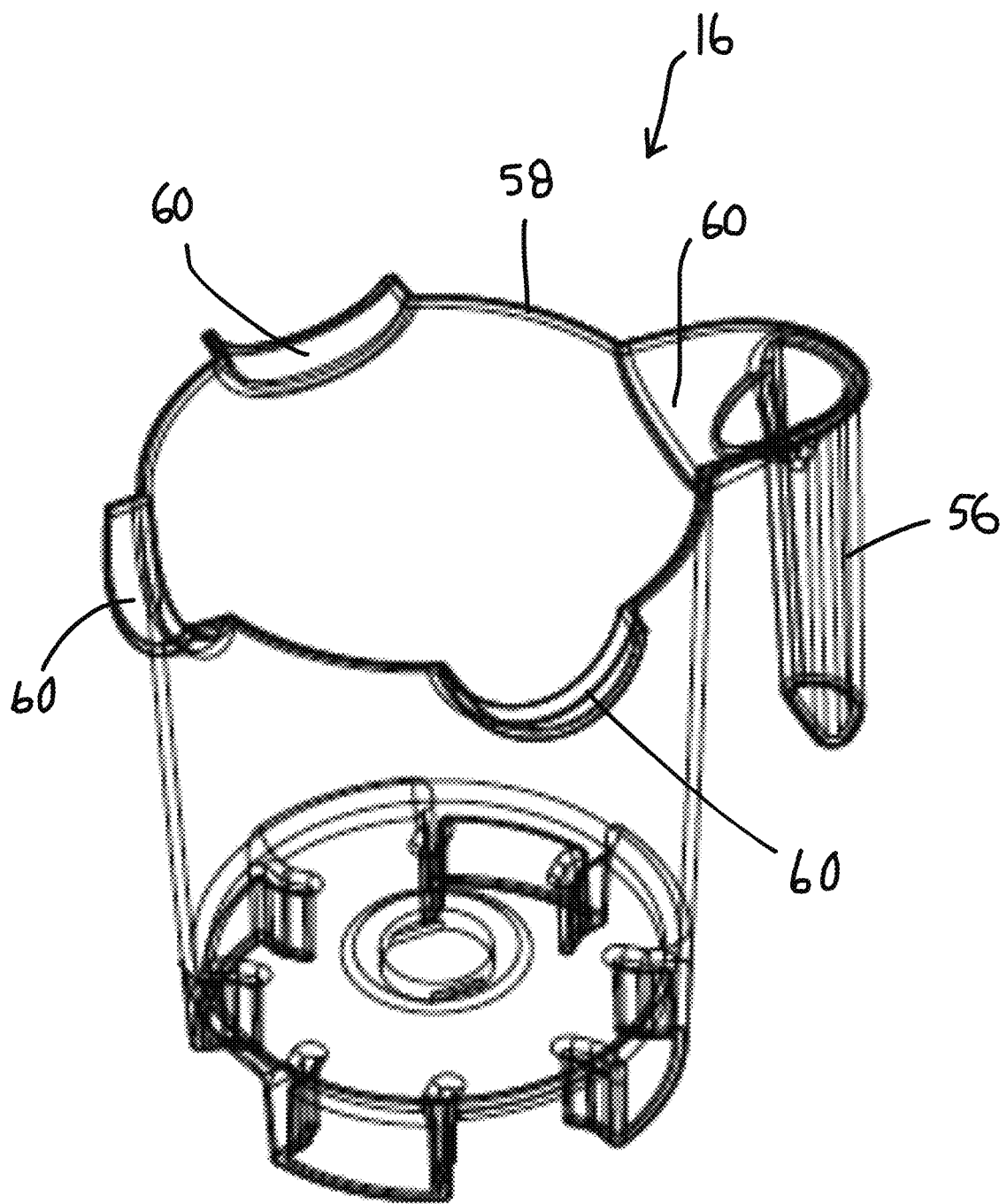
FIG. 9 is a perspective view of a blender jar of the food processing system of FIG. 1, according to an embodiment of the invention.

With reference to FIG. 9, a detail view of the container 16 for use with the food processing device 10 is illustrated. The container 16 is generally cylindrical in shape and has a handle 56 for easy handling of the container 16. As shown therein, the upper edge or lip 58 of the container is formed with a plurality of recesses or slots 60. In an embodiment, the recesses are generally arcuate or semi-circular (concave) in shape, and are equidistantly spaced along the lip 58. While four recesses 60 are illustrated, more or fewer than four may be present. The recesses 60, importantly, serve dual purposes, one of which is to function as pour spouts (except the recesses 60 in front of the handle 56). In particular, and as will be appreciated, by providing more than one recess 60 the contents of the container 16 may be poured therefrom regardless of the orientation in which the container 16 is held. That is, the container 16 can be tipped forward, or to either side, to empty the contents thereof. As disclosed above, and as is known in the art, the container 16 may be placed atop the base 12 such that the blades 18 inside the container 16 are rotatably driven by the output shaft 14 of the motor to process food items within the container 16.

Figure 10:
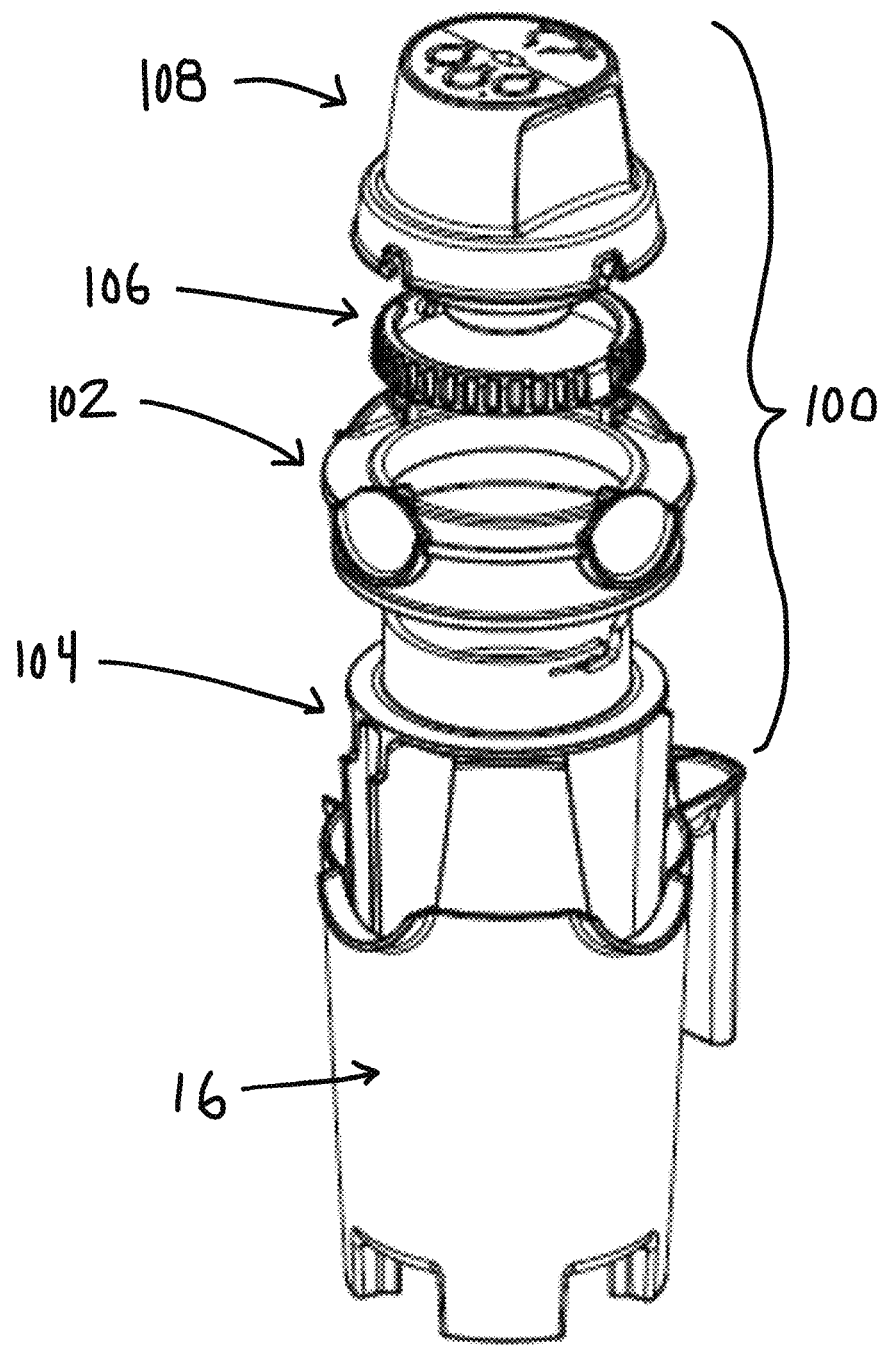
FIG. 10 is an exploded view of a motor driven dasher assembly of the food processing system of FIG. 1, according to an embodiment of the invention, shown in relation to the blender jar of FIG. 9.
Figure 11:
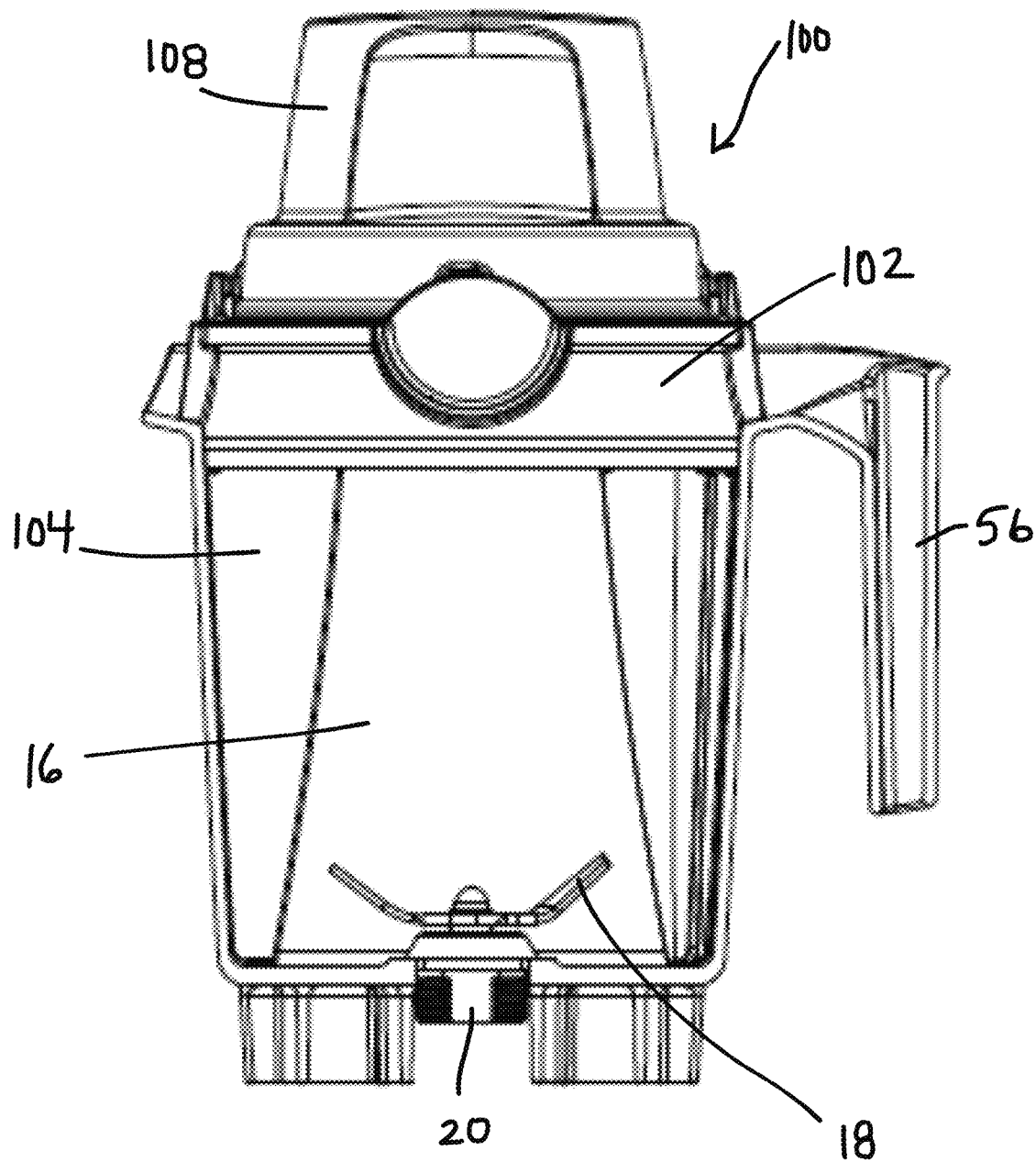
FIG. 11 is a side elevational view of the motor driven dasher assembly and blender jar.
Figure 12:
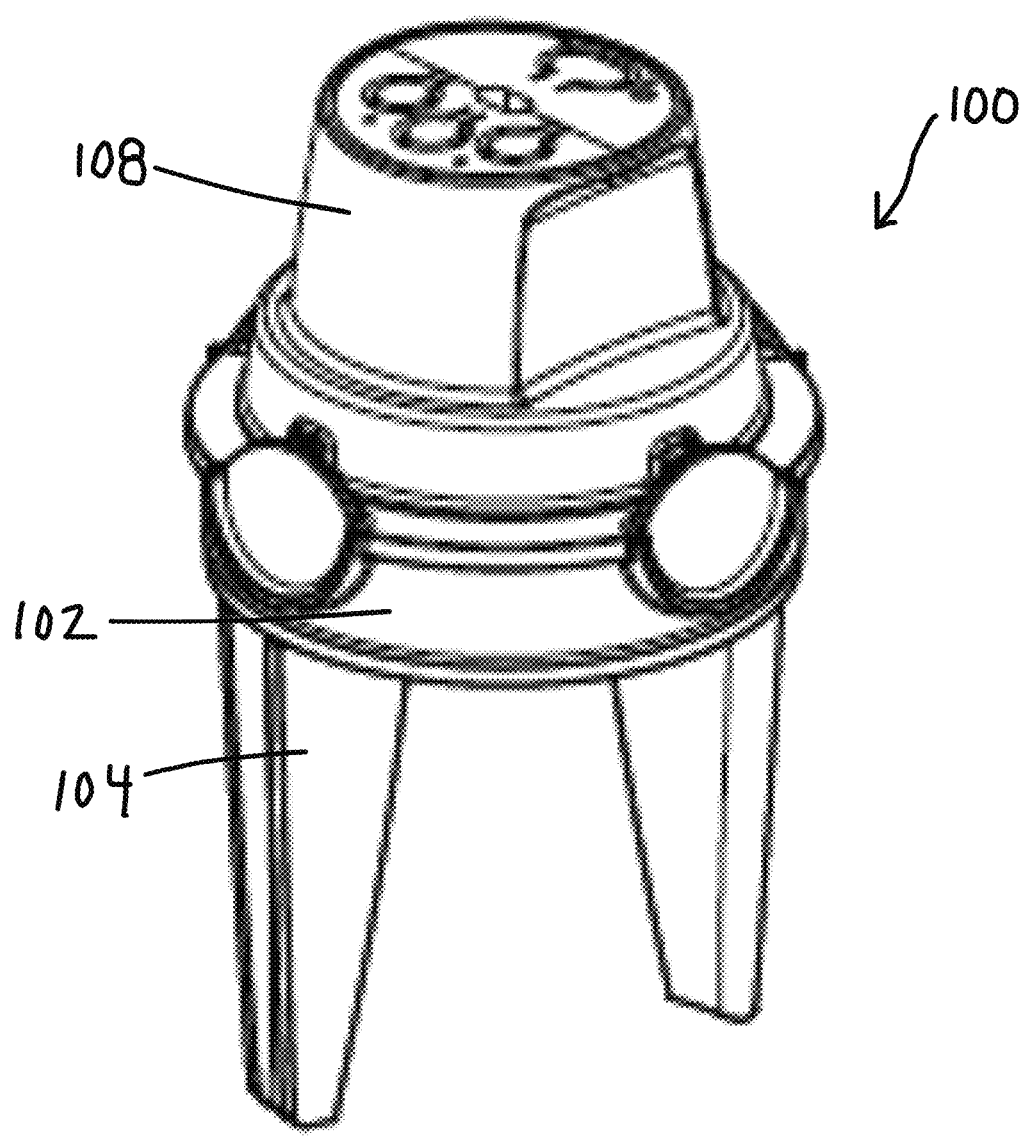
FIG. 12 is a perspective view of the dasher assembly of FIG. 10.
Figure 13:
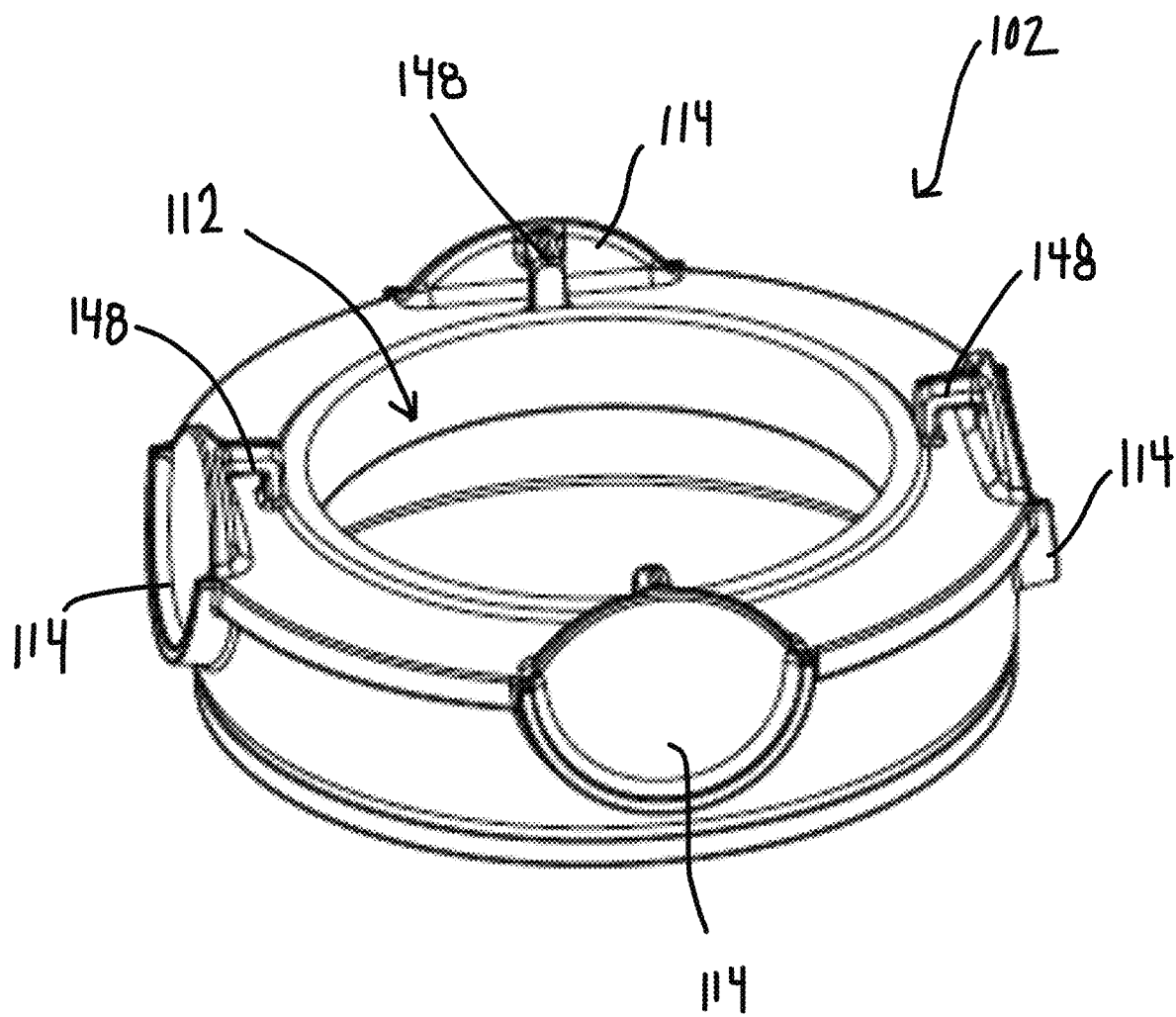
FIG. 13 is a perspective view of the lid of the blender jar, according to an embodiment of the present invention.

Turning now to FIGS. 10-12, in an embodiment, the food processing device 10 further a motor-driven dasher or scraper assembly 100 that is operable to scrape food from the interior sidewalls of the container 16 during processing. The motor-driven dasher assembly 100 includes a lid 102 configured to be received atop the processing container 16, a scraper device or dasher 104 that extends into the processing container 16 for scraping the interior sidewalls of the container 16, a retaining ring 106 for releasably connecting the dasher 104 to the lid 102, and a motor assembly 108 having a motor drivingly connected a rotatable output shaft 110 for rotatably driving the dasher 104 within the container 16.

Figure 15:
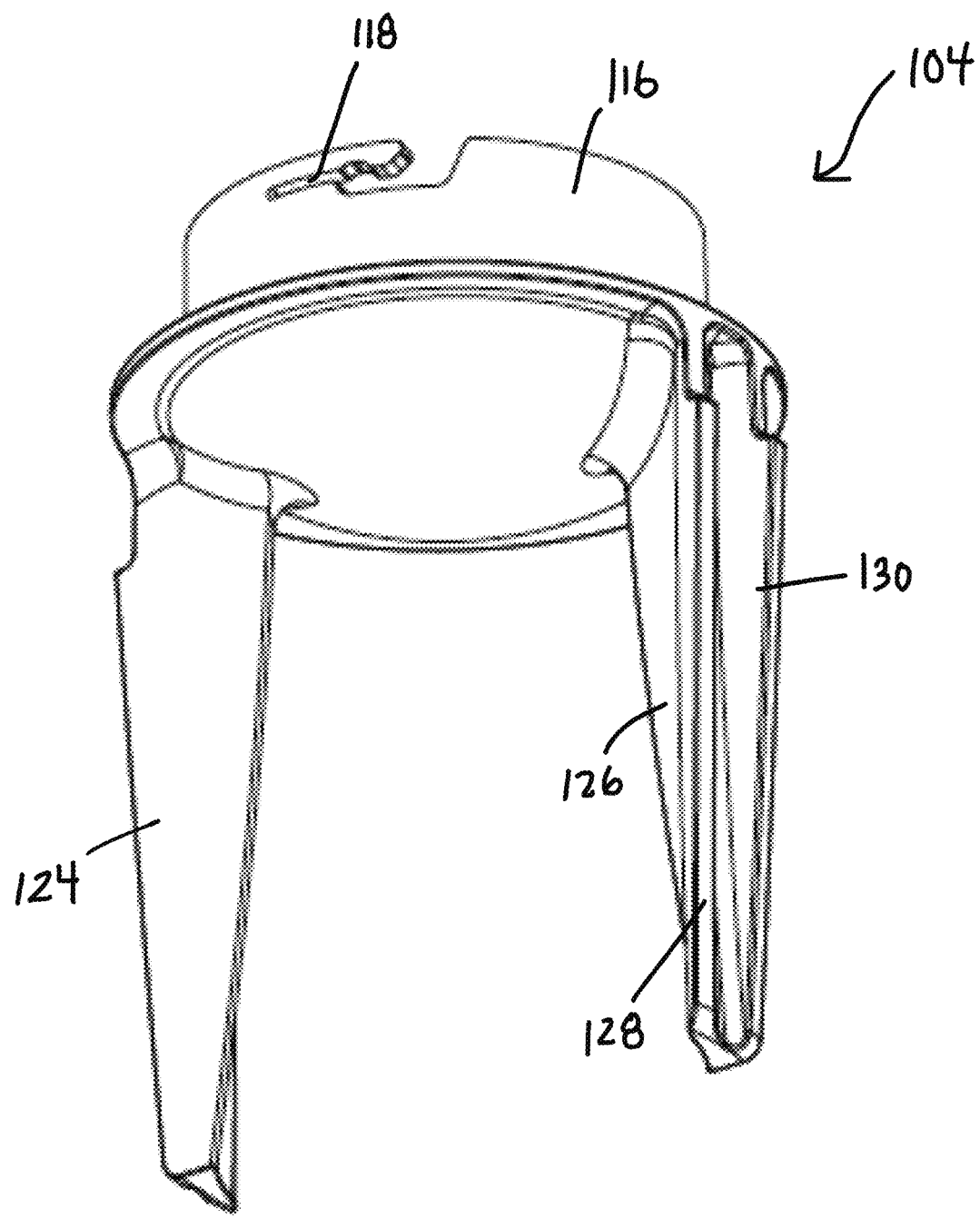
FIG. 15 is a bottom, perspective view of the dasher assembly.

With specific reference to FIG. 15, the lid 102 includes a central clearance opening 112 configured to receive an upper portion of the dasher 104, and a plurality of lugs 114 located along an outer periphery thereof. The lugs 114 are shaped and positioned so as to correspond to the recesses 60 in the upper lip 58 of the container 16. In particular, in an embodiment, the lugs 114 are semi-circular and convex in shape (depending downwardly from the outer periphery of the lid), and are received in the recesses 60 in the upper lip 58 of the container 16 when the lid 102 is positioned thereon, as discussed in detail below. Importantly, when the lid 102 is positioned atop the container 16 so that the lugs 114 are received in the recesses 60, rotation of the lid 102 relative to the container 16 is prevented.

Figure 14:
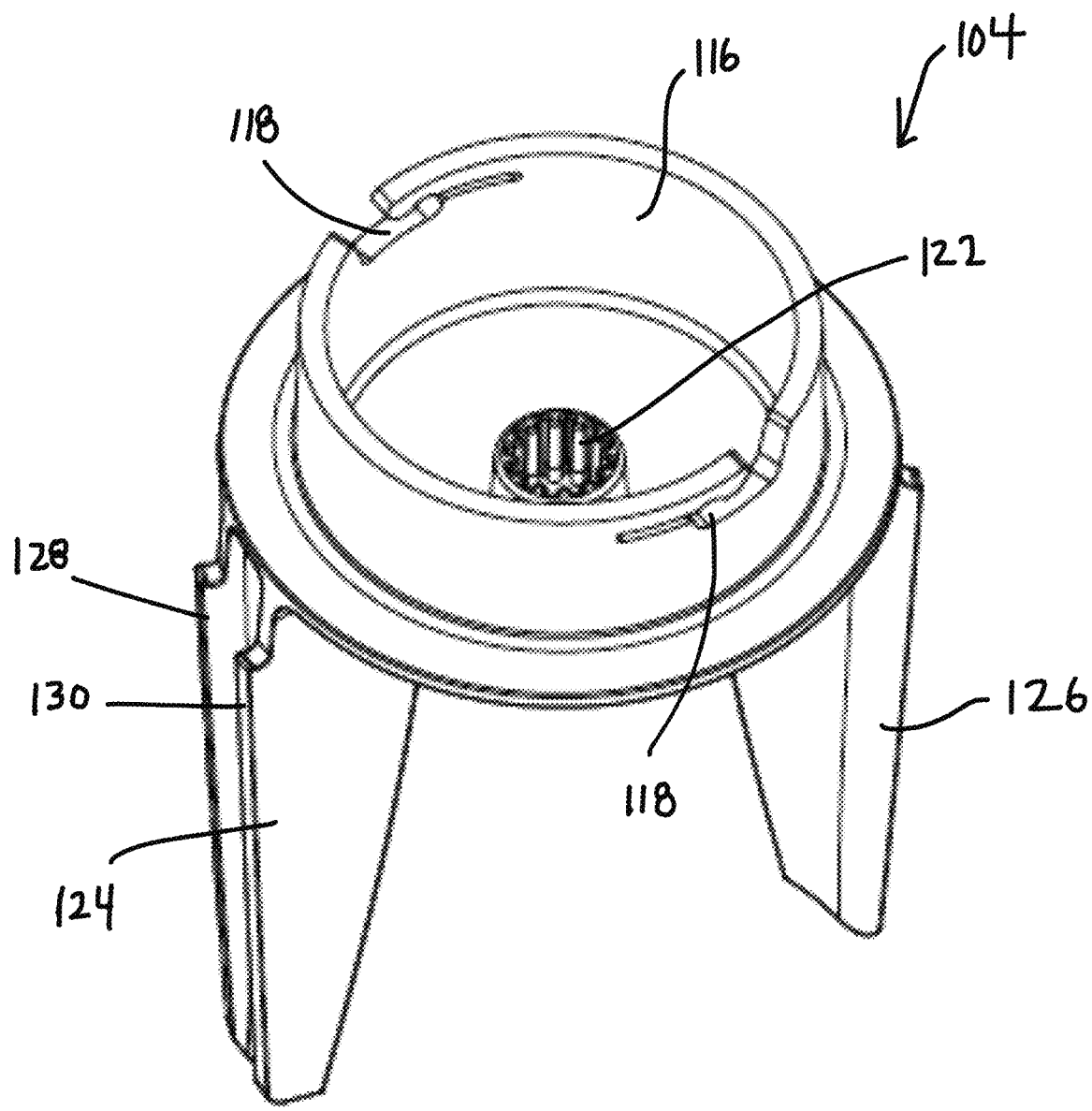
FIG. 14 is a top, perspective view of the scraper blade of the dasher assembly.
Figure 16:
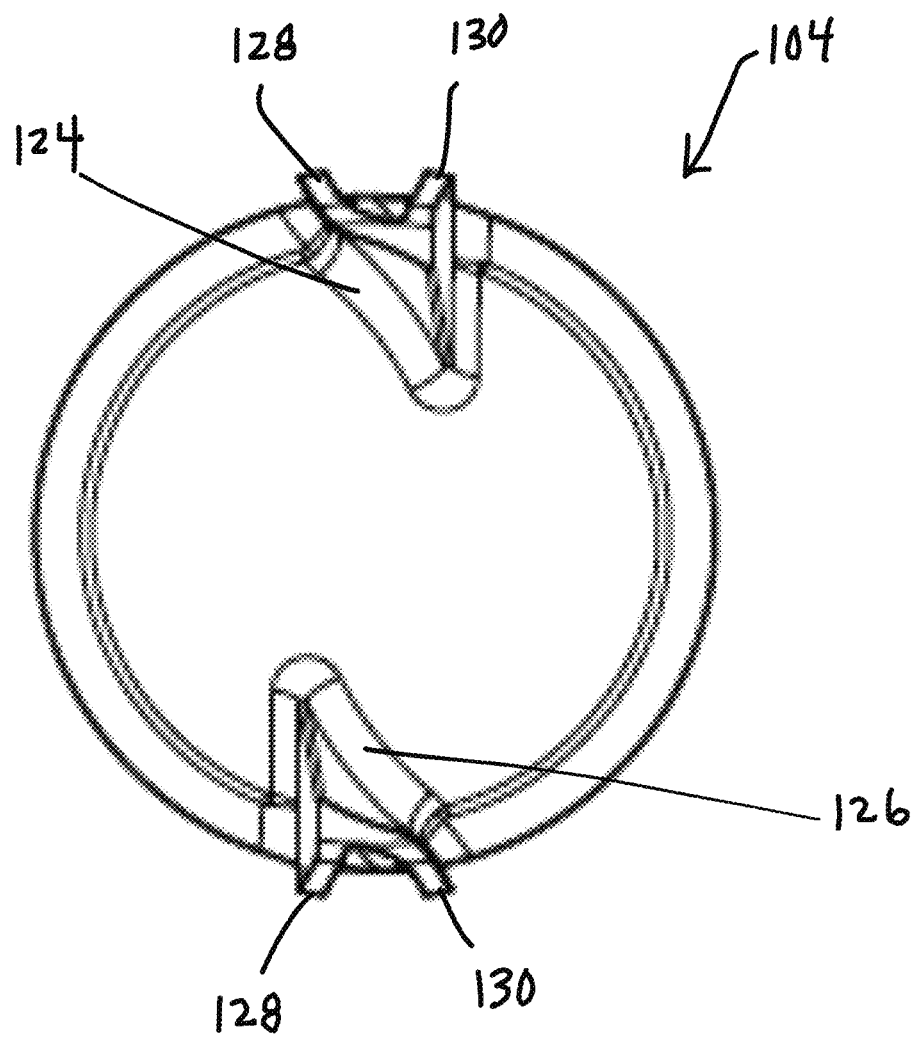
FIG. 16 is a bottom plan view of the dasher assembly.

With reference to FIGS. 14-16, the dasher 104 includes a generally cylindrical upper portion 116 having a connection mechanism for mating engagement with the retaining ring 106 which, as described below, is utilized to mount the dasher 104 to the lid 102. In an embodiment, the connection mechanism may be a bayonet-style mount where, for example, the cylindrical upper portion has a pair of opposed slots 118 for receiving radial pins or lugs 120 of the retaining ring 106 therein. While a bayonet-style connection mechanism is illustrated, other connection or mounting means may also be utilized without departing from the broader aspects of the invention. The dasher 104 also includes a centrally located, splined hub 122 that is configured to matingly receive the splined output shaft 110 of the motor assembly 108. As also shown in FIGS. 14-16, the dasher 104 includes a pair of scraper blades 124, 126 depending downwardly from the upper portion 116 and located radially outboard thereof. While a pair of scraper blades 124, 126 are illustrated, more or fewer than two blades may be present. As best shown in FIGS. 14 and 15, each scraper blade 124, 126 may have a pair of vertical wipers 128, 130. The distance between the outer edges of the scraper blades 124, 126 generally corresponds to the internal diameter of the container 16.

Figure 17:
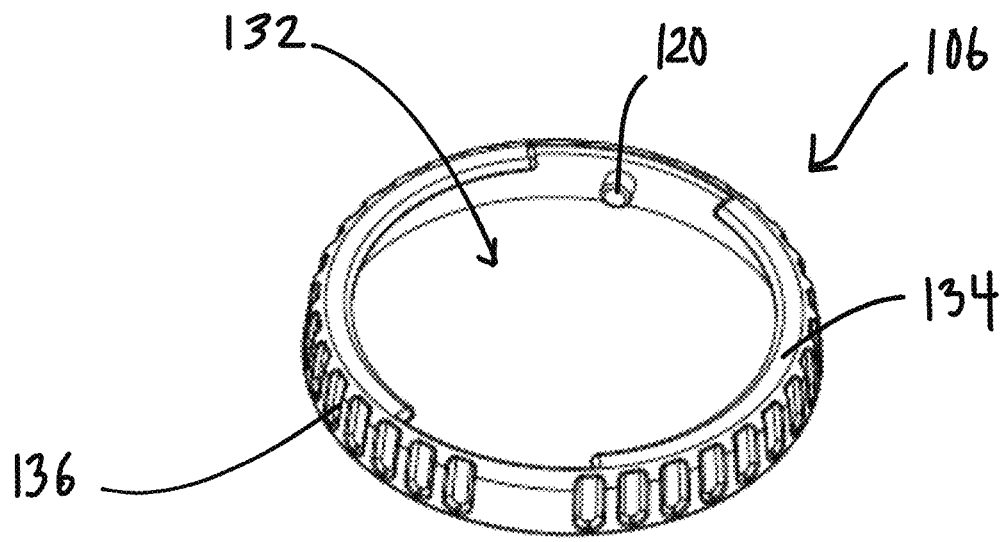
FIG. 17 is a top, perspective view of a retaining ring of the motor driven dasher assembly of FIG. 10.
Figure 18:
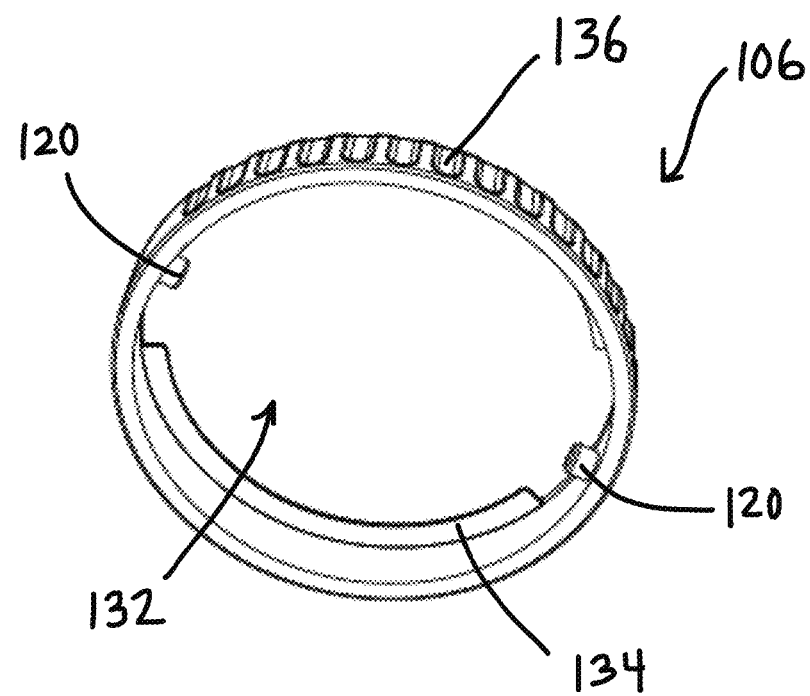
FIG. 18 is a bottom perspective view of the retaining ring.
Figure 19:
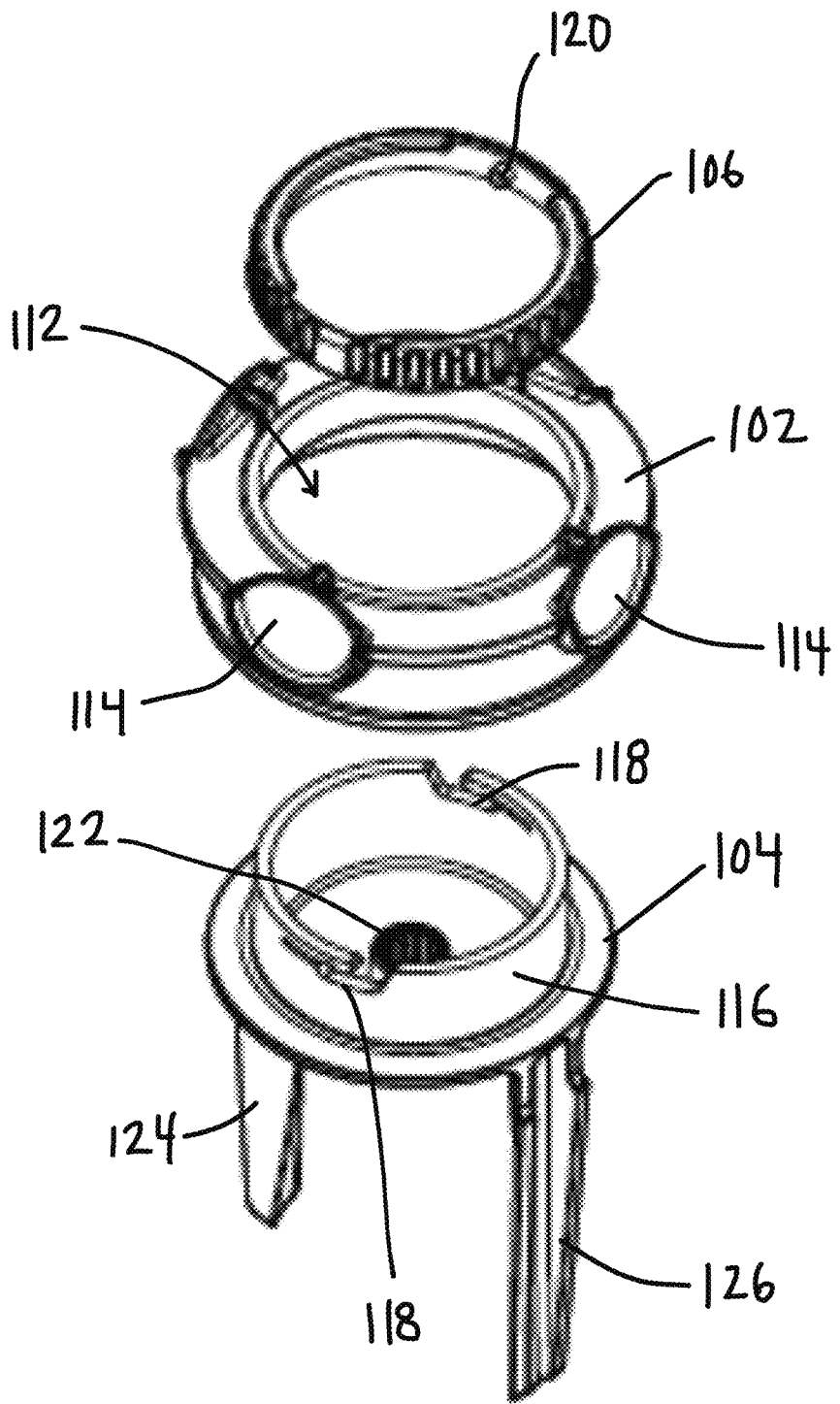
FIG. 19 is an exploded, perspective view of the dasher, lid and retaining ring of the dasher assembly.
Figure 20:
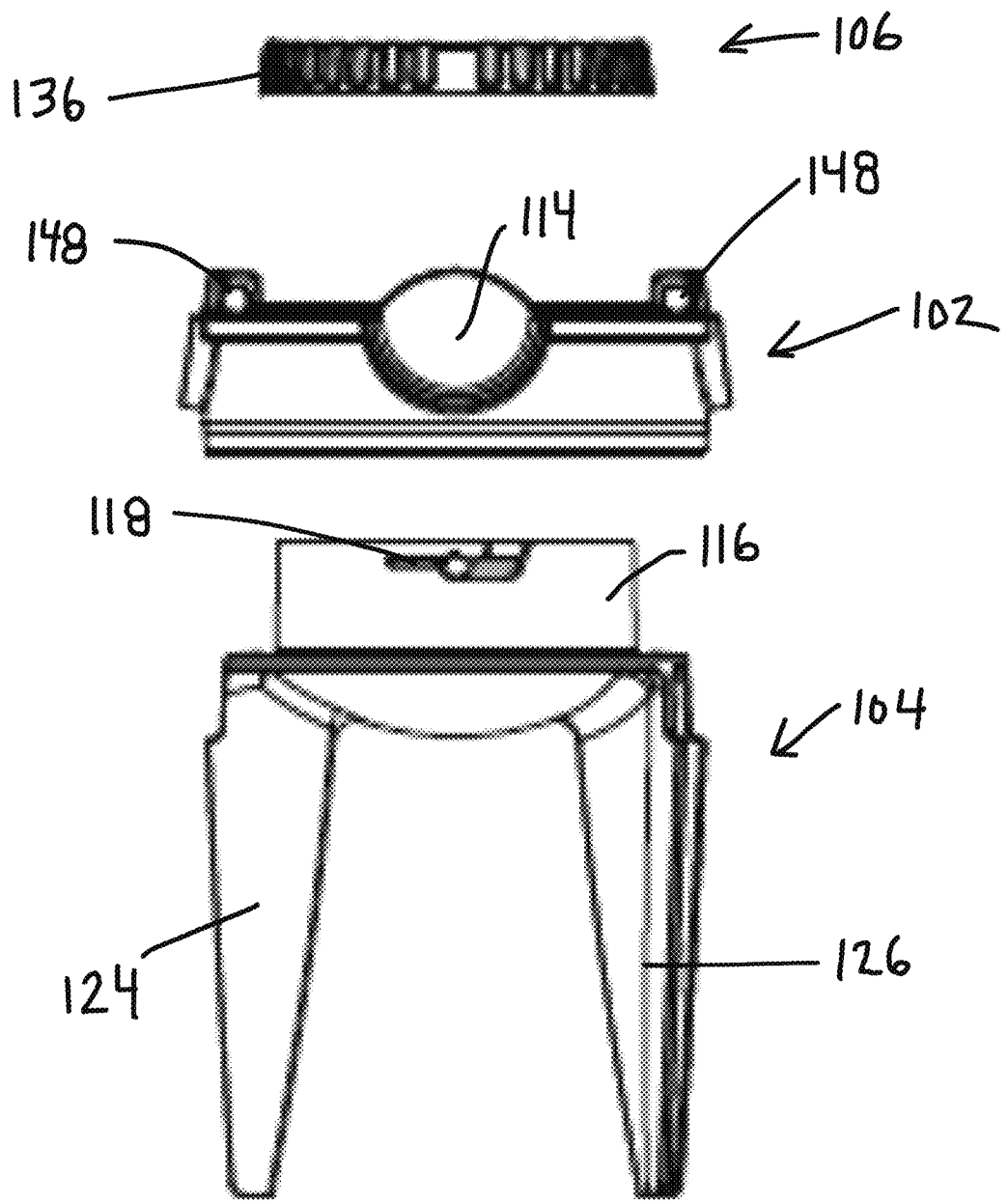
FIG. 20 is am exploded, side elevational view of the dasher, lid and retaining ring of the dasher assembly.
Figure 21:
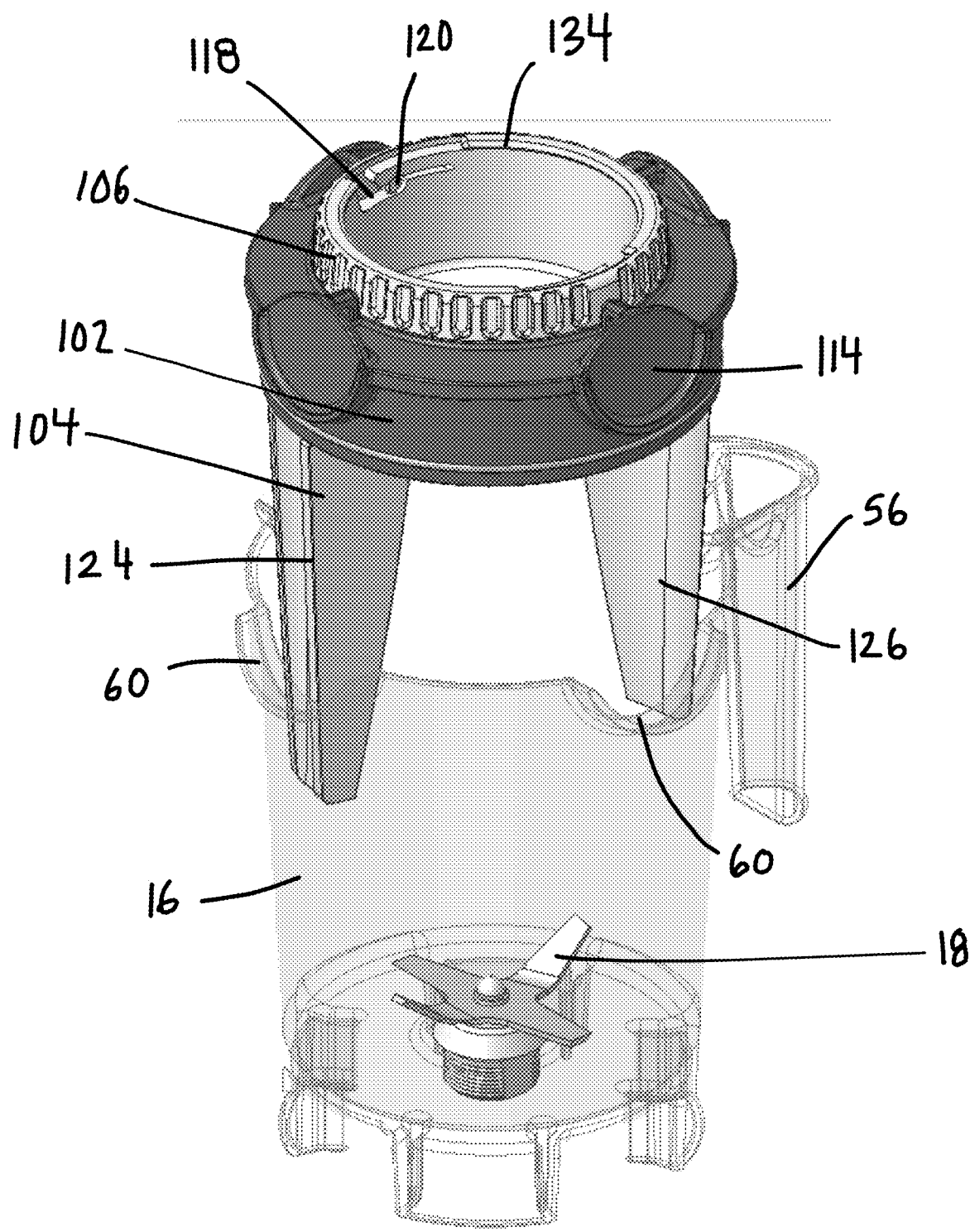
FIG. 21 is a perspective view showing insertion of the scraper blade into the blender jar.

FIGS. 17 and 18 illustrate the configuration of the retaining ring 106, which is generally annular in shape, having a central opening 132 having an inside diameter that is sized so as to closely receive the upper portion 116 of the dasher 104. Importantly, the diameter of the retaining ring 106 is greater than the diameter of the opening 112 in the lid 102. The retaining ring 106 further includes a flange 134 which is configured to serve as a position stop or locating surface for the upper edge of the upper portion 116 of the dasher 104. In an embodiment, the retaining ring 106 is formed with a peripheral gripping surface 136 (e.g., a plurality of projections, or lands and grooves) on the lateral periphery of the retaining ring 106 to facilitate gripping via user's hand. As indicated above, the retaining ring 106 also includes a pair of opposed radial lugs 120 that are configured to be received in corresponding bayonet slots 118 in the upper portion 116 of the dasher 104.

Figure 22:
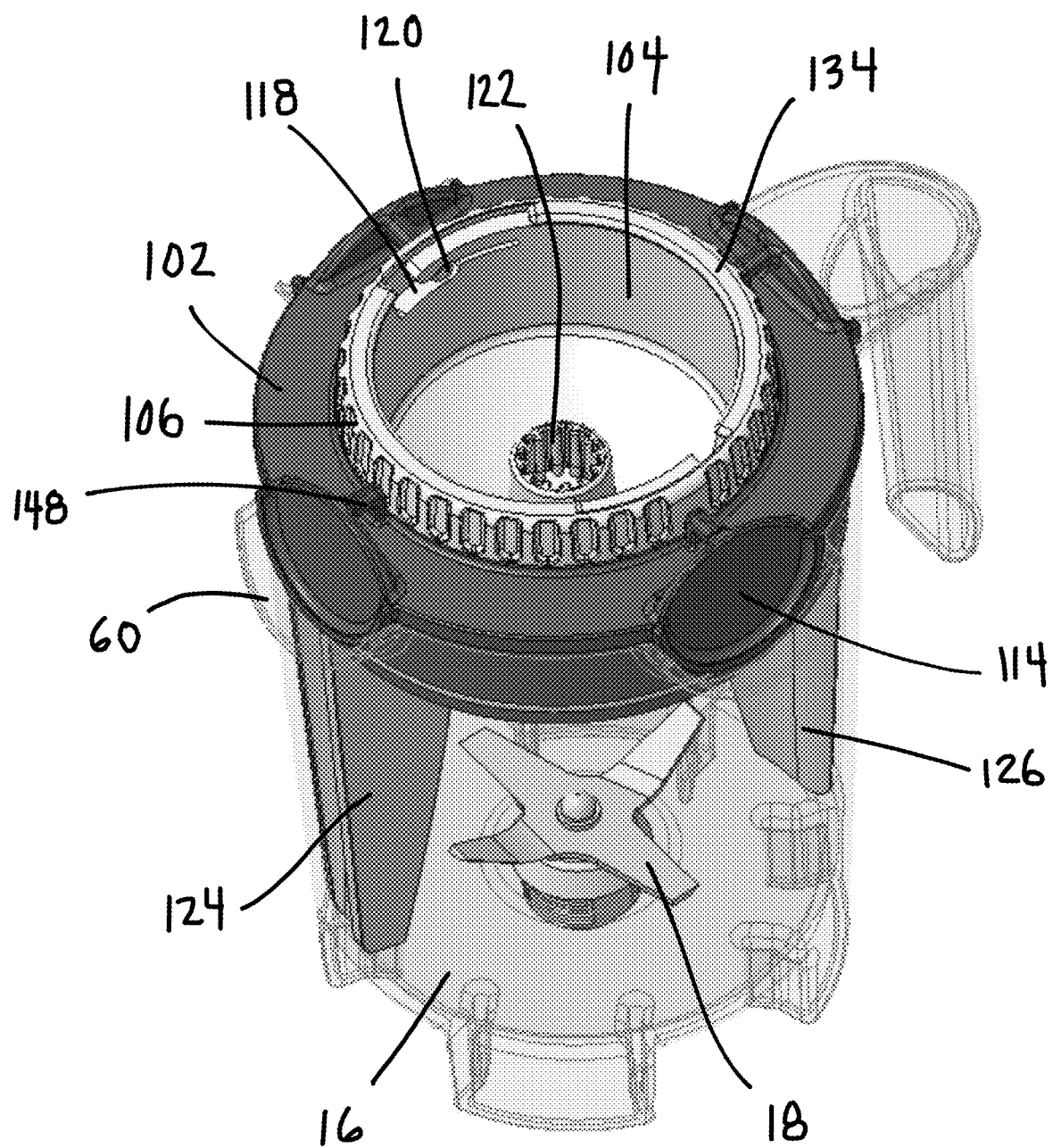
FIG. 22 is a perspective view showing the scraper blade inserted into the blender jar.
Figure 23:
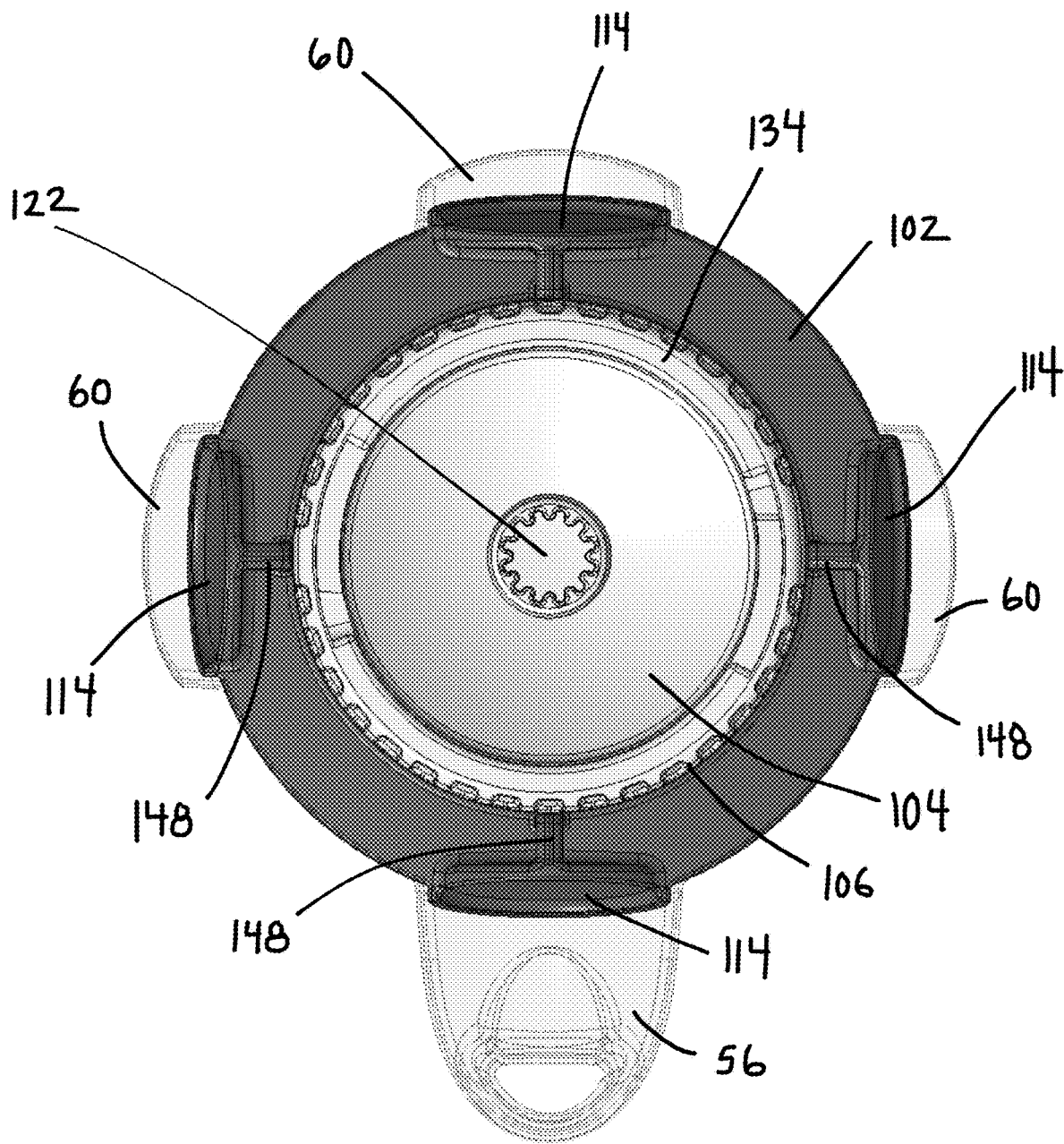
FIG. 23 is a top plan view showing the scraper blade inserted into the blender jar and the lid seated atop the blender jar.
Figure 24:
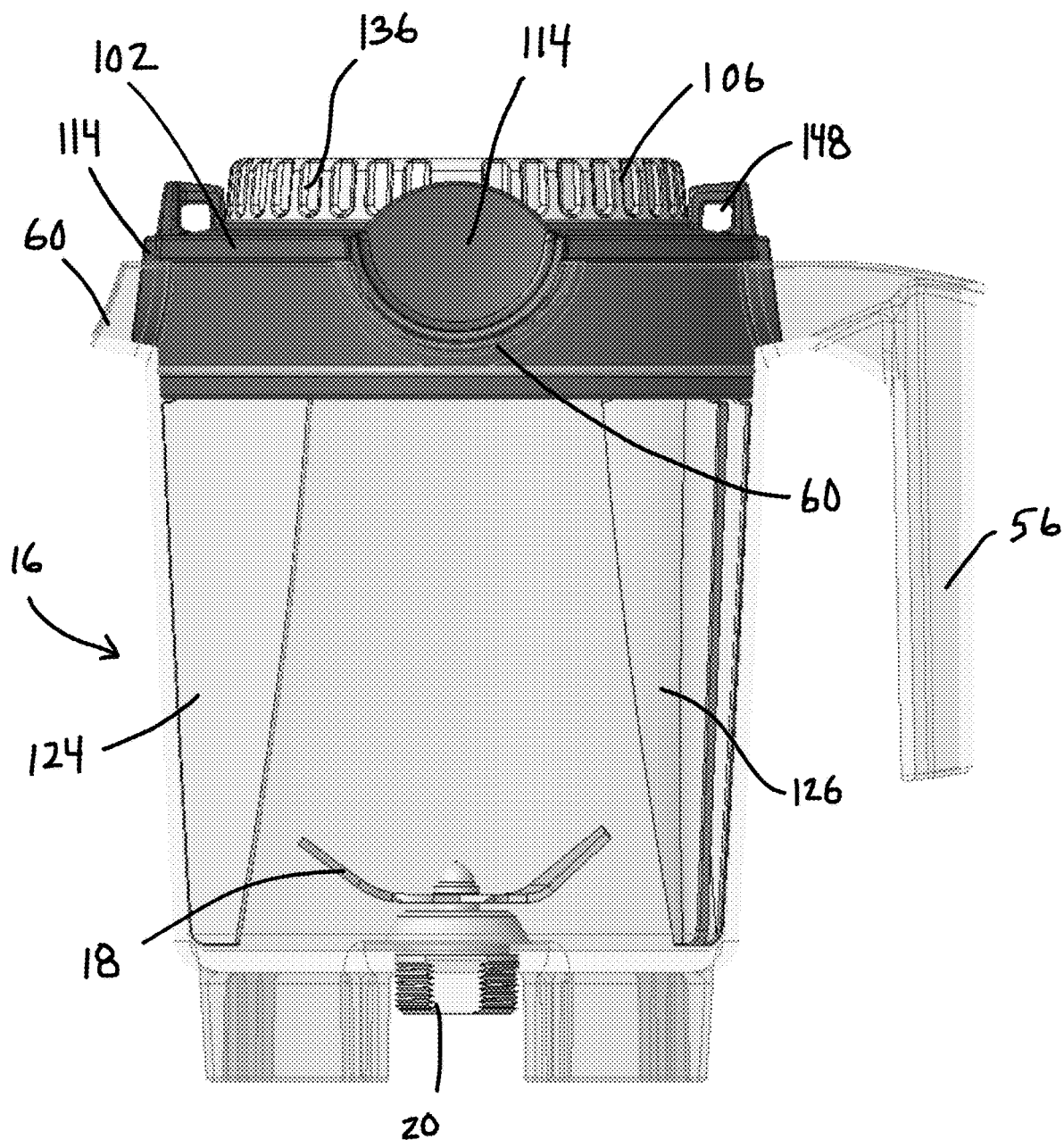
FIG. 24 is a side elevational view showing the scraper blade inserted into the blender jar and the lid seated atop the blender jar.

As shown in FIGS. 19-24, in use, the lid 102 is positioned above the dasher 104 and the cylindrical upper portion 116 of the dasher 104 is inserted through opening 112 in the lid 102. The retaining ring 106 is placed atop the lid 102 in a manner such that the radial lugs 120 are aligned with the upward-facing portion of slots 118 in the upper portion 116 of the dasher. Once the lugs 120 are received in the slots 118, the retaining ring 106 is rotated while holding the lid 102 and dasher 104 stationary so that the lugs 120 move to a seated position within the distal ends of the slots 118 in the dasher 104. In this position, the dasher 104 is coupled to the lid 102 via the retaining ring 106, forming an integrated assembly. The lid 102 can then be placed atop the container 16 so that the scraper blades 124, 126 of the dasher 104 are received within the container 16 in close association (or in contacting engagement with) the inner sidewalls of the container 16. As best shown in FIGS. 22 and 24, in this position, the downwardly depending lugs or projections 114 on the periphery of the lid 102 are received in the corresponding slots/recesses 60 in the upper lip of the container 16. As disclosed above, the lid 102 is constrained against rotation by this interengagement. However, the dasher 104 and retaining ring 106 remain free to rotate relative to the lid 102. Other means may also be utilized to connect the dasher 104 to the retaining ring 106 such as, for example, a snap fit.

Figure 25:
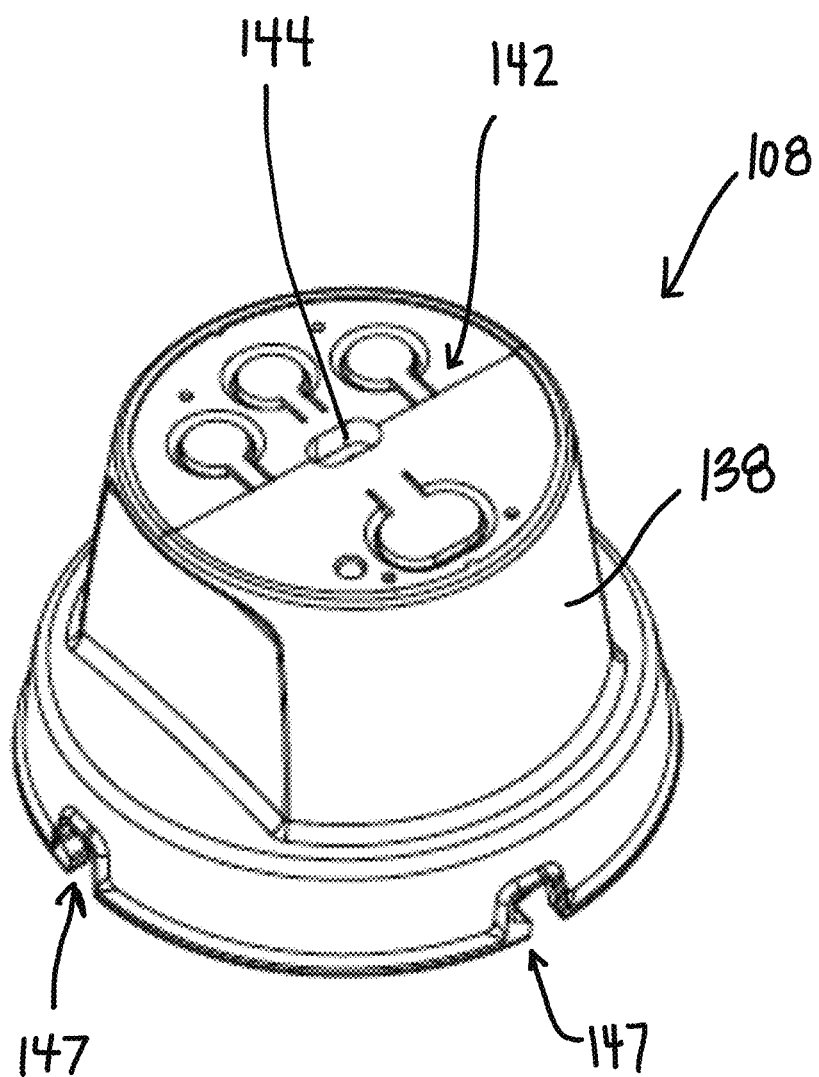
FIG. 25 is a top, perspective view of a motor assembly of the motor driven dasher assembly of FIG. 10.
Figure 26:
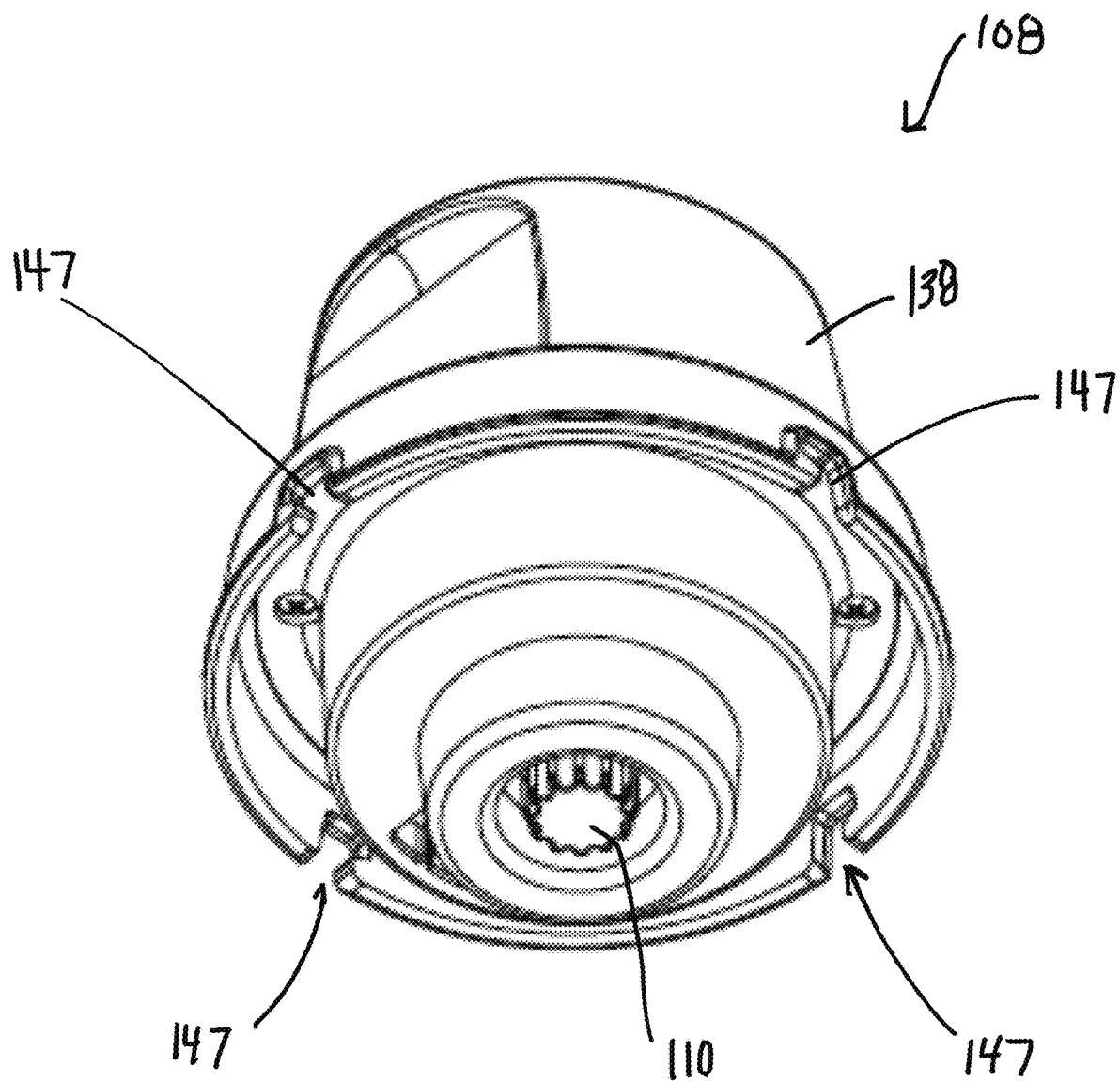
FIG. 26 is a bottom, perspective view of the motor assembly.
Figure 27:
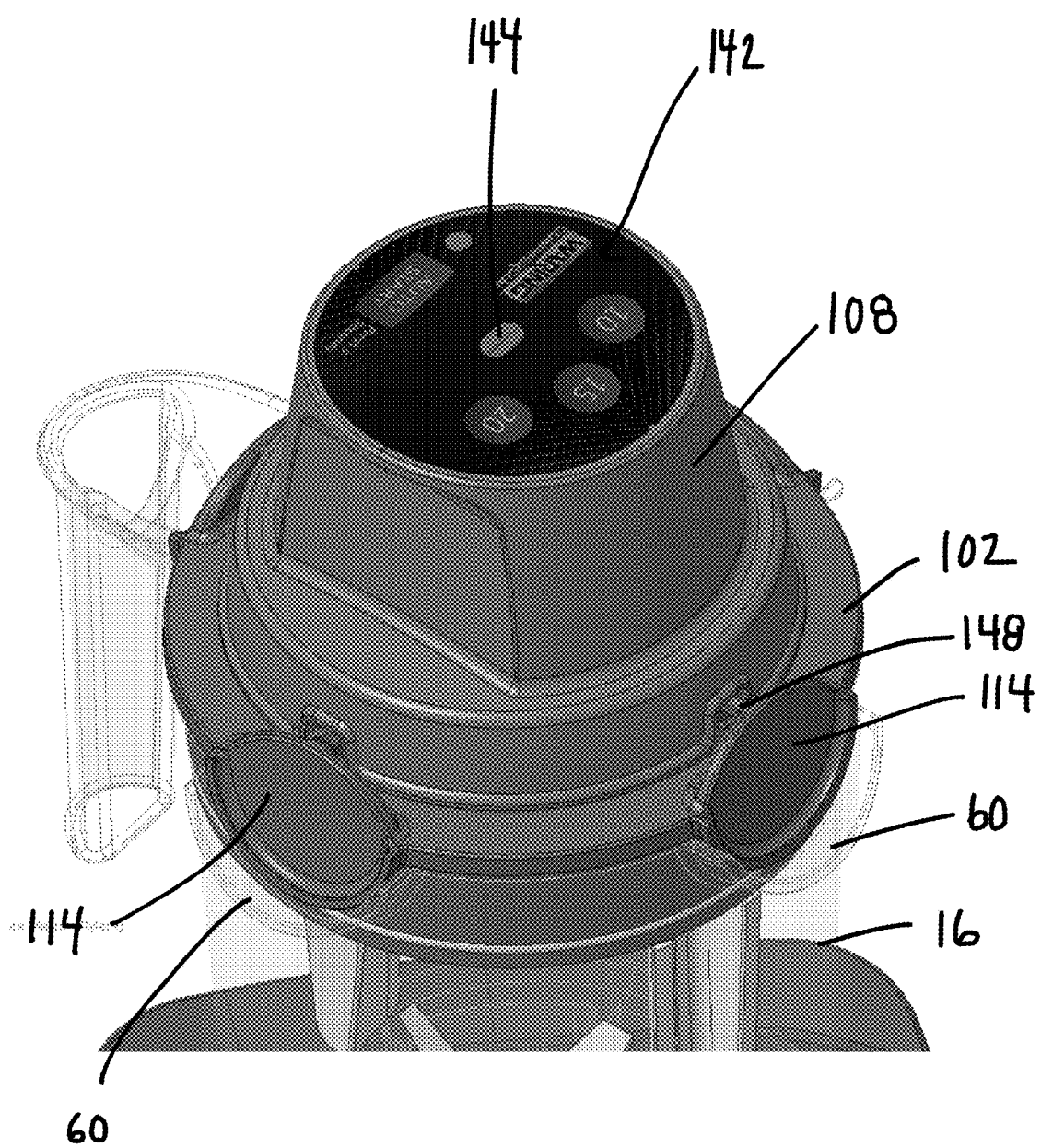
FIG. 27 is a perspective view showing the motor driven dasher assembly installed in the blender jar.
Figure 28:
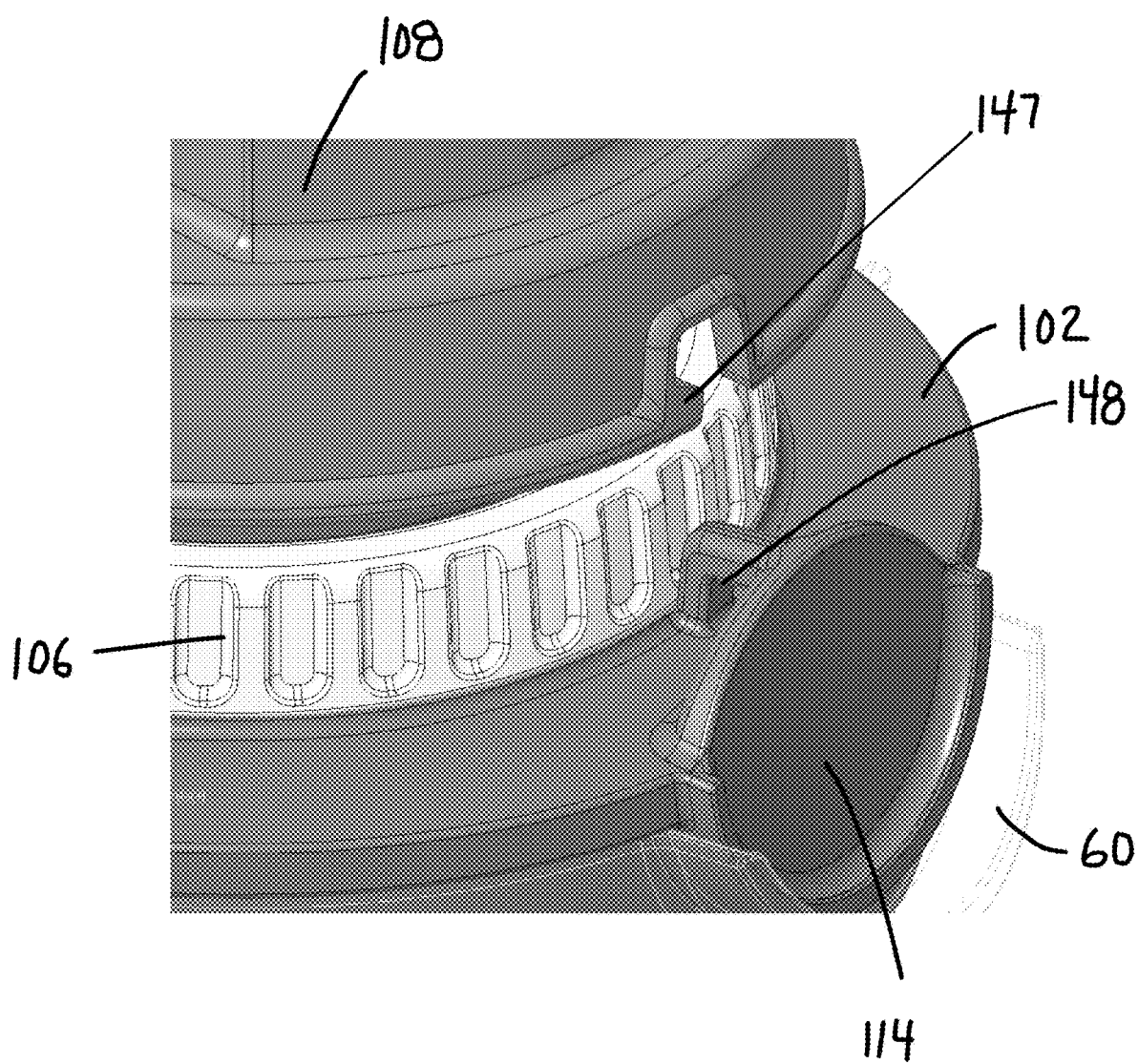
FIG. 28 is an enlarged, detail view of a portion of the motor driven dasher assembly, illustrating connection of the motor housing to the lid.
Figure 29:
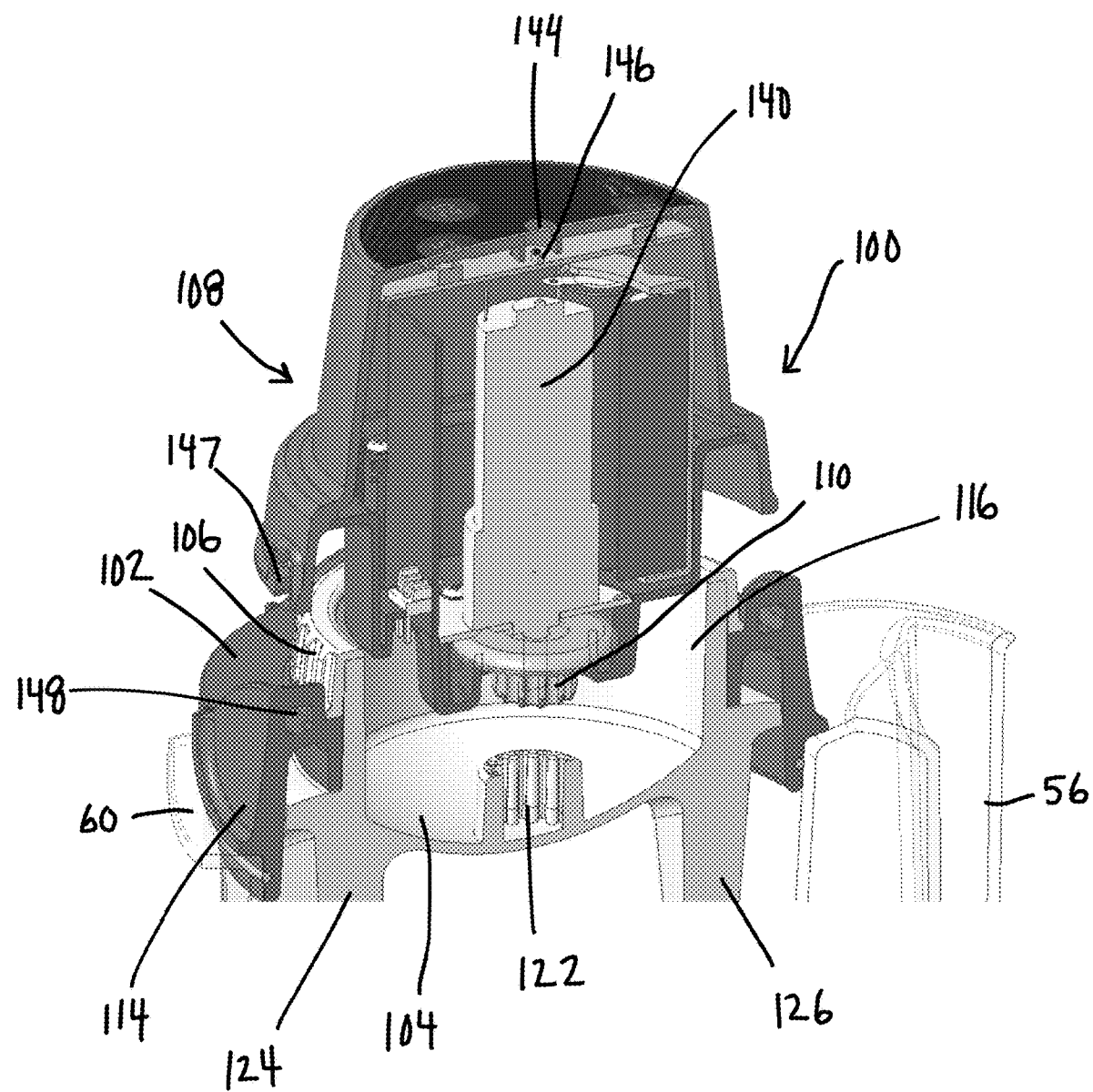
FIG. 29 is a cross-sectional, perspective view of the motor driven dasher assembly, shown installed on the blender jar.
Figure 30:
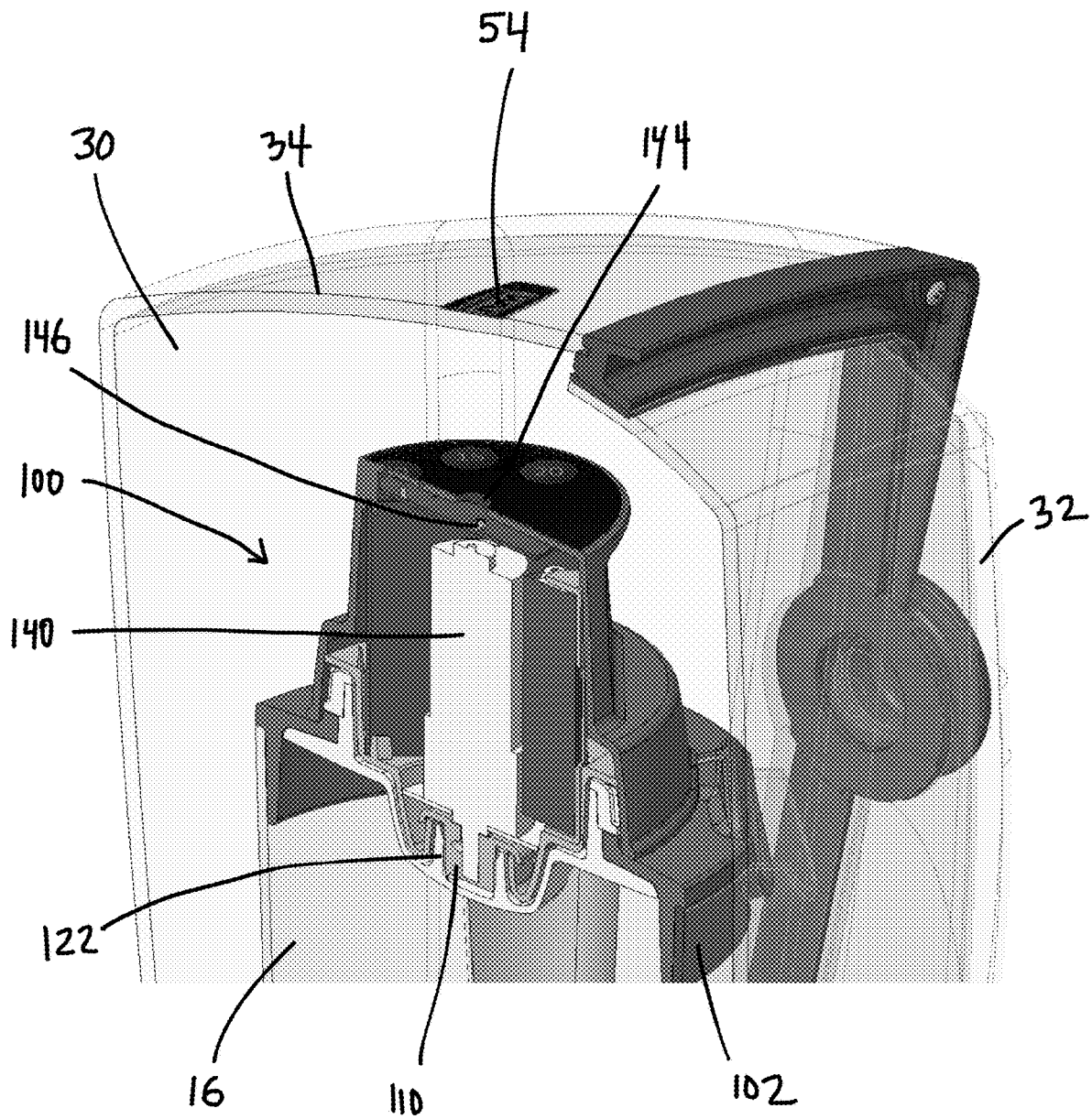
FIG. 30 is a cross-sectional, perspective view of the food processing system of FIG. 1, showing the blender jar and motor driven dasher assembly in operational position within the sound enclosure.

FIGS. 25, 26 and 29 illustrate the configuration of the motor assembly 108 according to one embodiment of the invention. As shown therein, the motor assembly 108 includes a housing 138 which contains therein a motor 140 having splined output shaft 110 that is rotatably driven by the motor 140. In an embodiment, the motor 140 is preferably powered by an on-board power supply (e.g., a battery). In an embodiment, the output shaft 110 is keyed to the hub 122 of the dasher 104. While the output shaft 110 and hub 122 are illustrated as being splined, it is contemplated that other keyed configurations enabling rotational movement of the shaft 110 to be transmitted to the hub 122 may also be employed without departing from the broader aspects of the invention. The housing 138, on an upper surface thereof, has a control interface 142 having a plurality of buttons, knobs, switches or the like, enabling a user to control operation of the motor 140.

With specific reference to FIG. 29, the upper surface also includes a window or aperture 144. As best shown in FIG. 29, the motor assembly 108 also includes an optical emitter/receiver (e.g., an optical transceiver) 146 positioned beneath the window 144 and configured to emit light from the housing 138 through the window 144, the purpose of which will be described hereinafter. The transceiver 146 is in communication with a controller (not shown) of the motor assembly 108 and may emit and receive wavelengths of light from the visible portion of the electromagnetic spectrum, or the light may be from a sub-visible portion of the electromagnetic spectrum. For example, sub-visible light may include, narrow angular displacement infrared light, infrared (IR) light or ultraviolet (UV) light. However, it should be noted that any wave frequency in the electromagnetic spectrum capable of being emitted and received is envisioned to be within the scope of the present disclosure. The examples of visible, IR, and UV light are not intended to be limiting examples. While the present invention envisions utilizing a transceiver for emitting and receiving reflected light, as discussed below, it is contemplated that a separate light emitter and light sensor/receiver may, alternatively, be utilized.

Referring back to FIGS. 25 and 26, a lower peripheral edge of the housing 138 is formed with a plurality of male locking members (e.g., hook members 147) that are configured to be received in corresponding female locking members or keyways 148 of the lid 102. As shown in FIG. 27-30, in use, once the lid 102 is placed atop the container 16 so that the blades 124, 126 are disposed within the container 16 and the lugs 114 of the lid 102 are received in the corresponding recesses 60 in the container 16, the motor assembly 108 is placed atop the lid 102 such that the output shaft 110 of the motor 140 is mated with the hub 122 of the dasher 104. The motor housing 138 is then rotated relative to the lid until the hook members 147 are received through the keyways 148 in this lid. In this position, the motor assembly 108 is locked to the lid 102 and cannot be removed by simply pulling axially upward on the motor assembly 108. That is, in order to remove the motor assembly 108, the motor housing 138 must be rotated clockwise to disengage the hooks 147 from the keyways 148.

Notably, the motor is configured to rotate the dasher 104 in a first (e.g., clockwise direction) which, if left unconstrained, would cause an opposite (i.e., counterclockwise) rotation of the housing 138. The configuration of the hook members 147 is such that the direction of rotation of the motor housing 138 (if left unconstrained) urges the hook members 147 into locking engagement with the keyways 148 when the motor is operated. During operation, this rotational force is relatively constant, maintaining the motor housing 138 in a secure, locked state with respect to the lid 102.

As will be appreciated, the dasher assembly 100 is operable to scrape the interior sidewalls of the container 16, via scraper blade 124, 126. In particular, the motor 140 rotates output shaft 110, which rotates the dasher 104 and the scraper blades 124, 126 thereof to scrape the interior sidewalls of the container 16. This is helpful in removing foodstuffs that may be stuck to the interior sidewalls of the container 16 and redirecting them towards the blades 18 of the processing container 16, ensuring even and consistent mixing, blending, chopping, etc. This is particularly useful when processing thick foodstuffs such as nut butters, hummus, shakes, smoothies, and the like. Importantly, as disclosed hereinafter, the dasher assembly 100 can be operated simultaneously with a food processing operation (i.e., at the same time that the blades 18 of the container 16 are active), or when the food processing operation is paused or ceased. In addition, the dasher assembly 100 is configured so that it is automatically initiated when the sound enclosure 30 is moved to the closed position.

Figure 31:
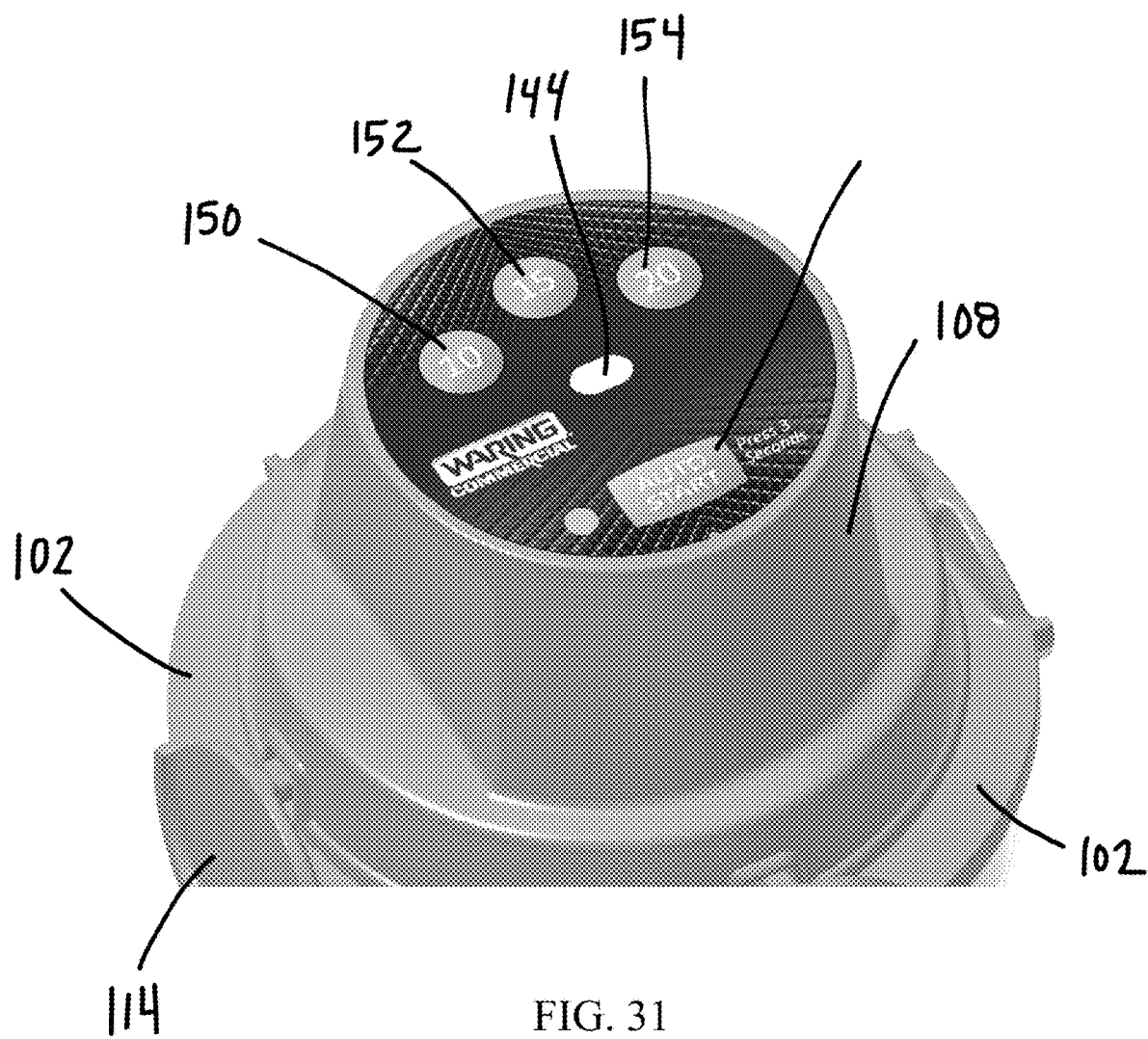
FIG. 31 is a perspective view of the motor housing of the motor driven dasher assembly.
Figure 32:
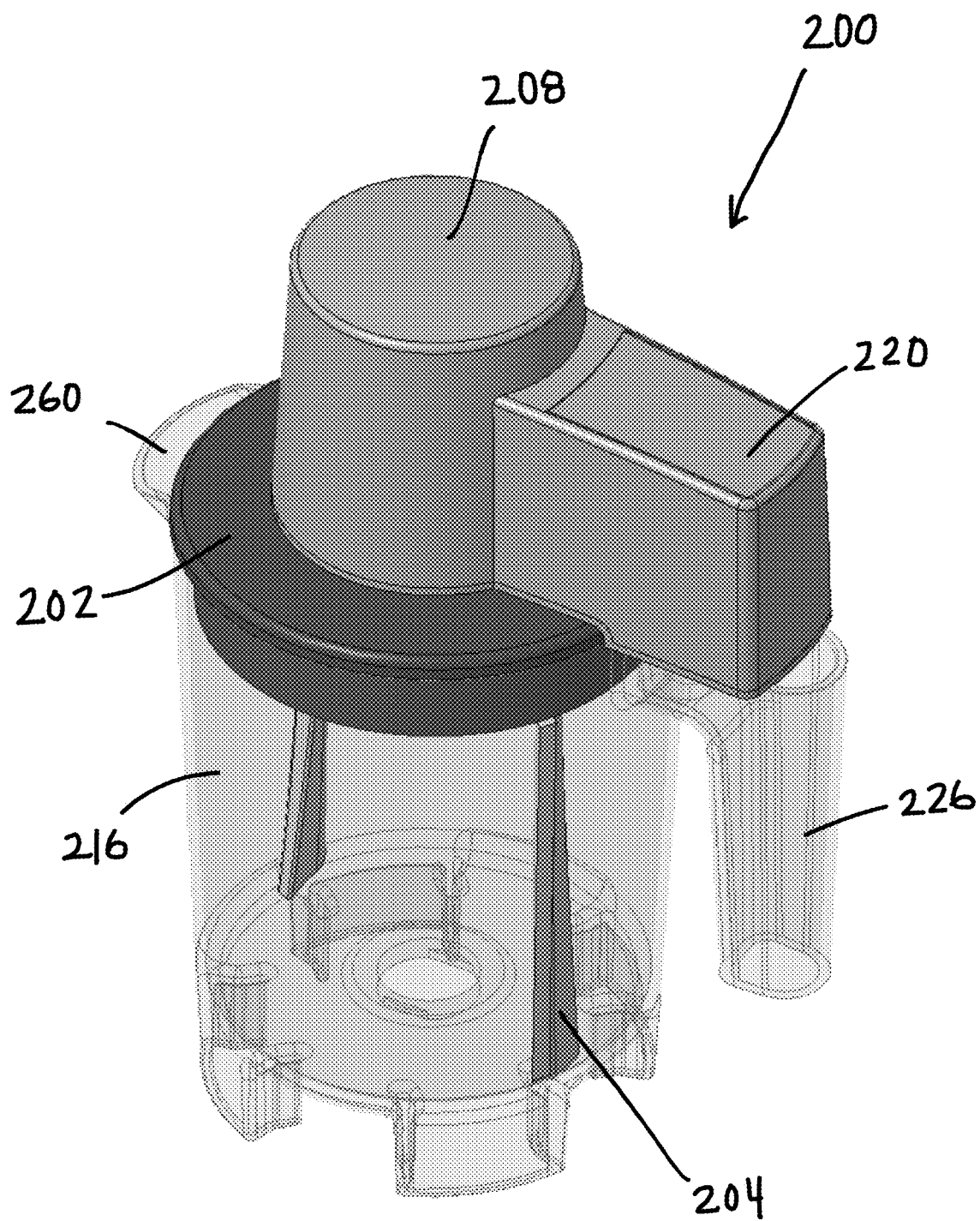
FIG. 32 is a perspective view of a motor driven dasher assembly according to another embodiment of the invention.
Figure 33:
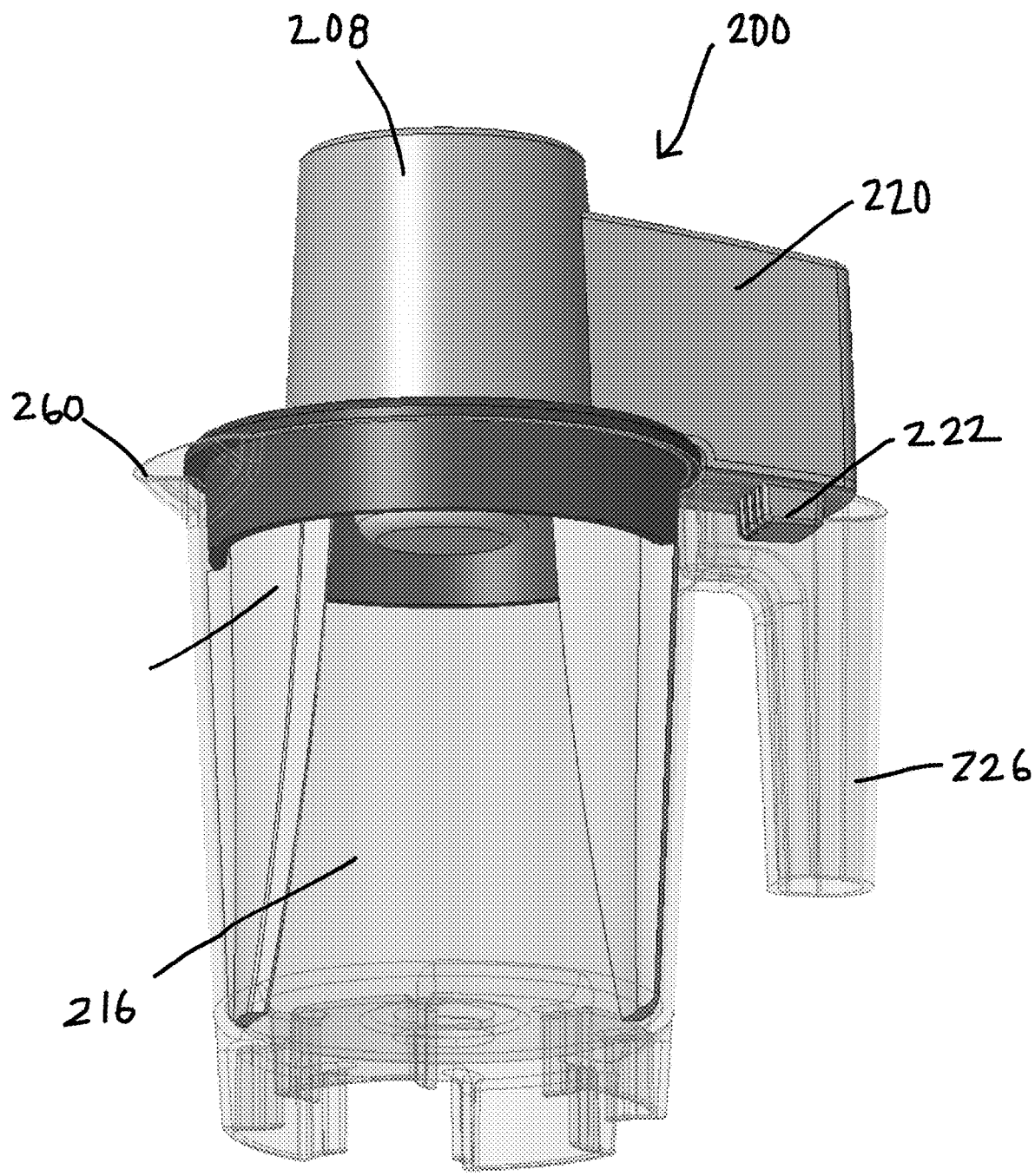
FIG. 33 is another perspective view the motor driven dasher assembly of FIG. 32.
Figure 34:
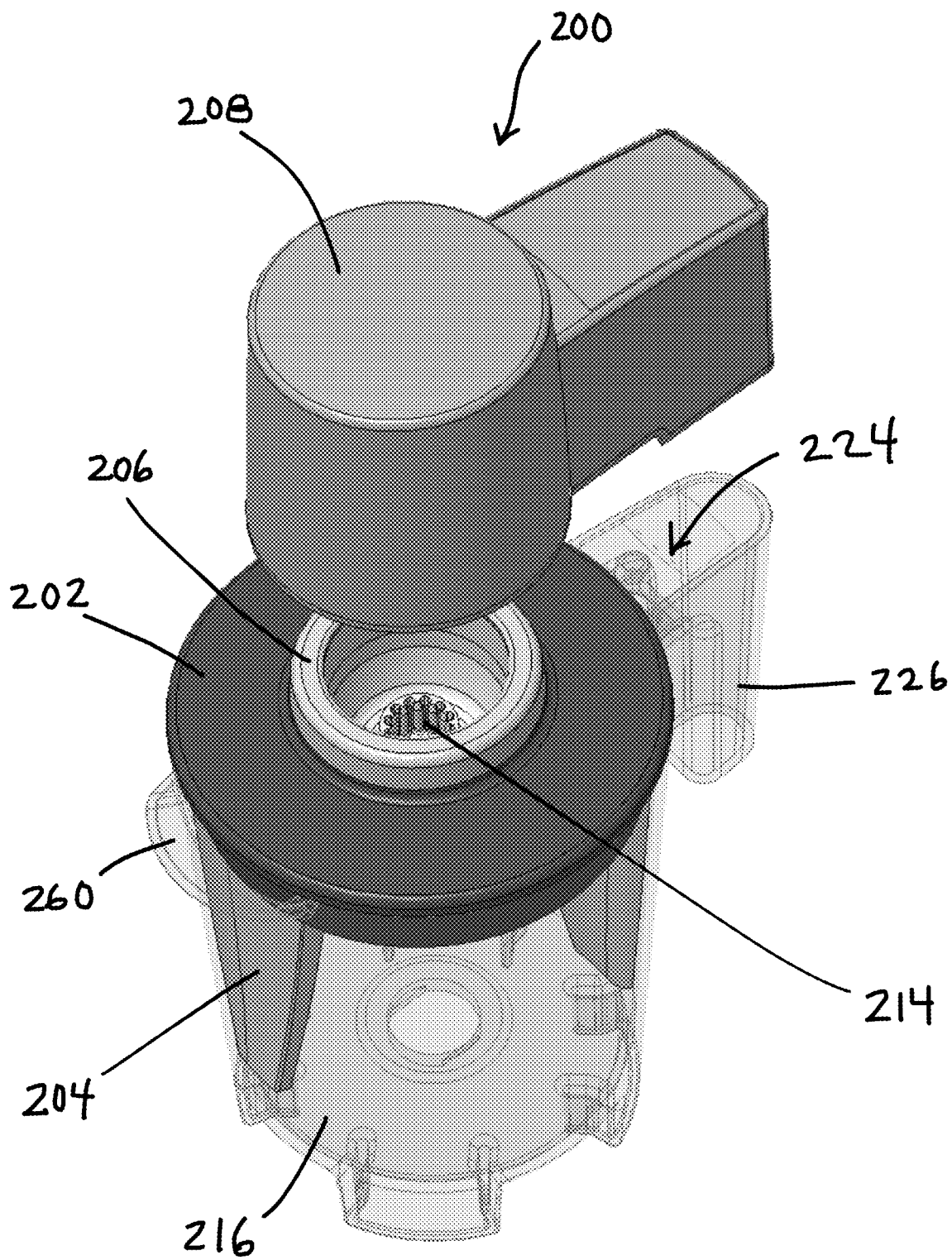
FIG. 34 is a partially exploded, top perspective view of the motor driven dasher assembly of FIG. 32.

In connection with the above, and with particular reference to FIG. 31, the interface 142 of the motor assembly 108 may include a plurality of timer start/stop buttons 150, 152, 154 configured to initiate rotation of the dasher 104 for a preprogrammed amount of time (e.g., 10 seconds, 15 seconds and 20 seconds, respectively). The interface 142 also includes an auto start button 156 that is utilized to enable or disable automatic starting of the motor 140 of the dasher assembly 100 when the sound enclosure 30 is in the closed position, as discussed in detail hereinafter. Still further, the interface 142 includes a LED indicator 158 that blinks or flashers when the transceiver 146 is active (i.e., emitting and receiving light). In an embodiment, the LED indicator 158 may operate in a cycle where it is on for approximately 350 ms, and off for 3,650 ms. The interface 142, as described above, is in communication with a controller (not shown) of the motor assembly 108 for carrying out a set of preprogrammed functions. For example, pressing one of the buttons 150, 152, 154 will prompt the controller to run the motor 140 for the preprogrammed time indicated on the button. Pressing the same button a second time will canceled the previously selected run time. In addition, pressing any other button during the selected rub time will cancel the preciously selected run time.

As alluded to above, the IR transceiver 146 is operable in one of two modes: standby mode and active mode. When the IR transceiver 146 is in standby mode, it is in low power (OFF). Pressing and holding the auto start button 156 for three seconds turns on the transceiver 146 so that it emits light out of the housing 138 through the window 144. This is the active mode of the transceiver 146. To turn off the transceiver and place it once again in standby mode, the button 156 is again depressed for three seconds. The controller of the motor assembly 108 is also programmed such that if the IR transceiver 146 is in active mode and no IR activity of timer buttons have been pressed for a predetermined period of time (e.g., 4 hours), the transceiver 146 is placed in standby mode. To place the transceiver 146 in active mode, the button 156 is held for three seconds, as indicated above.

Referring back to FIGS. 6 and 7, in the active mode of operation (initiated by depressing the auto start button 156), the transceiver 146 emits light, represented by arrow 160, through the window 144 in the motor housing 138. As shown in FIG. 6, if the front enclosure member 34 is not in the closed position, the reflective element 54 on the top of the front enclosure member 34 is not aligned with the window 144 in the housing 138 of the motor assembly 108. Accordingly, the light 160 passes through the enclosure 30 and is not reflected back towards the transceiver 146. As illustrated in FIG. 7, however, when the enclosure 30 is closed (i.e., when the front enclosure member 34 is in the closed position shown in FIG. 7), the reflective element 54 is in registration with (e.g., positioned directly above) the window 144. In this case, the light, represented by arrow 162 in FIG. 7, emitted by the transceiver 146 passes through the window 144 in the motor housing 138 and is reflected back (downwardly) by the reflective element 54 on the movable front enclosure member 34 of the enclosure. The reflected light is detected/sensed by the transceiver 146, which indicates to the controller of the motor assembly 108 that the sound enclosure 30 is in its closed position. In response, the controller activates the motor 140 to rotate the dasher 104 to scrape the interior sidewalls of the container 16 for a duration/cycle previously selected by an operator. In this respect, operation of the dasher assembly 100 is operable even when the sound enclosure 30 is in its closed position and the motor assembly 108 cannot be manually accessed.

Importantly, therefore, in an embodiment, auto start functionally may be enabled for both the motor in the base 12 (for driving the blades 18 during a food processing operation), as well as the motor 140 in the dasher assembly 100 (for driving the scraping blades 124, 126). This allows an operator to select a pre-programmed food processing mode and/or duration, as well as a scraping/wiping mode and/or duration, and then simply move the sound enclosure 30 to its closed potion to initiate both operations.

In an embodiment, the motor assembly 108 (e.g., the controller thereof) is programmed such that if the motor 140 is not running, any button depression or IR reflection (if auto start is ON) starts the motor and sets a timer (which can be preselected by using the timer buttons). If the motor is running, any button press or loss of light reflection/detection (indicating that the enclosure 30 has been opened) stops the motor and clears the timer. In an embodiment, light reflection can only be detected by the transceiver 146 if the transceiver 146 is in active mode. If the transceiver 146 is not emitting light (i.e., has not been placed into active mode), then the system is configured to power down after 5 seconds of no activity. If the operator starts the motor 140 using one of the timer buttons, then closes the sound enclosure 30, the timer will not be reset (but will carry out the scraping operation for the selected duration). If the sound enclosure 30 is opened, the motor 140 will be deactivated and the timer cleared.

Figure 35:
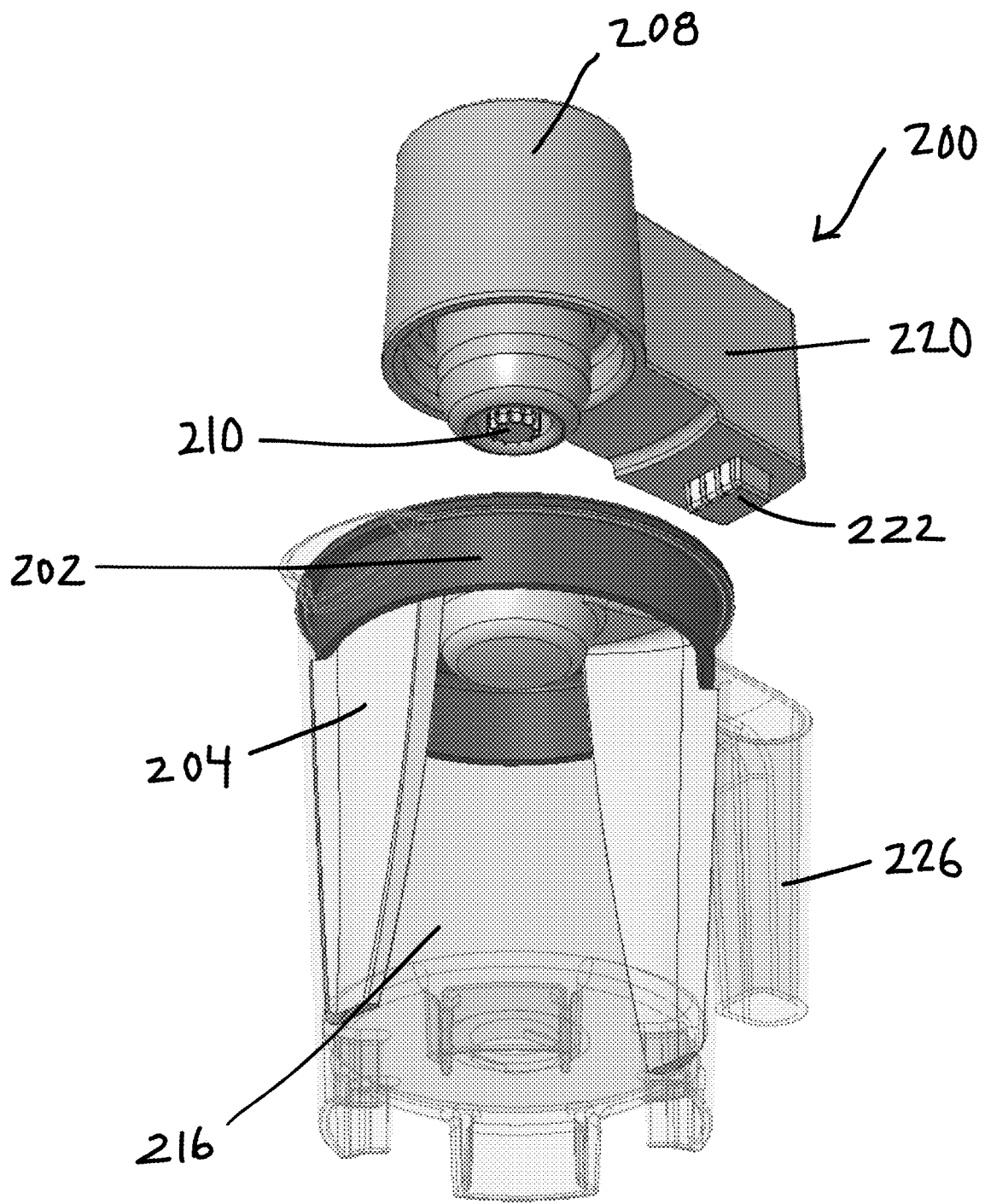
FIG. 35 is a partially exploded, bottom perspective view of the motor driven dasher assembly of FIG. 32.
Figure 36:
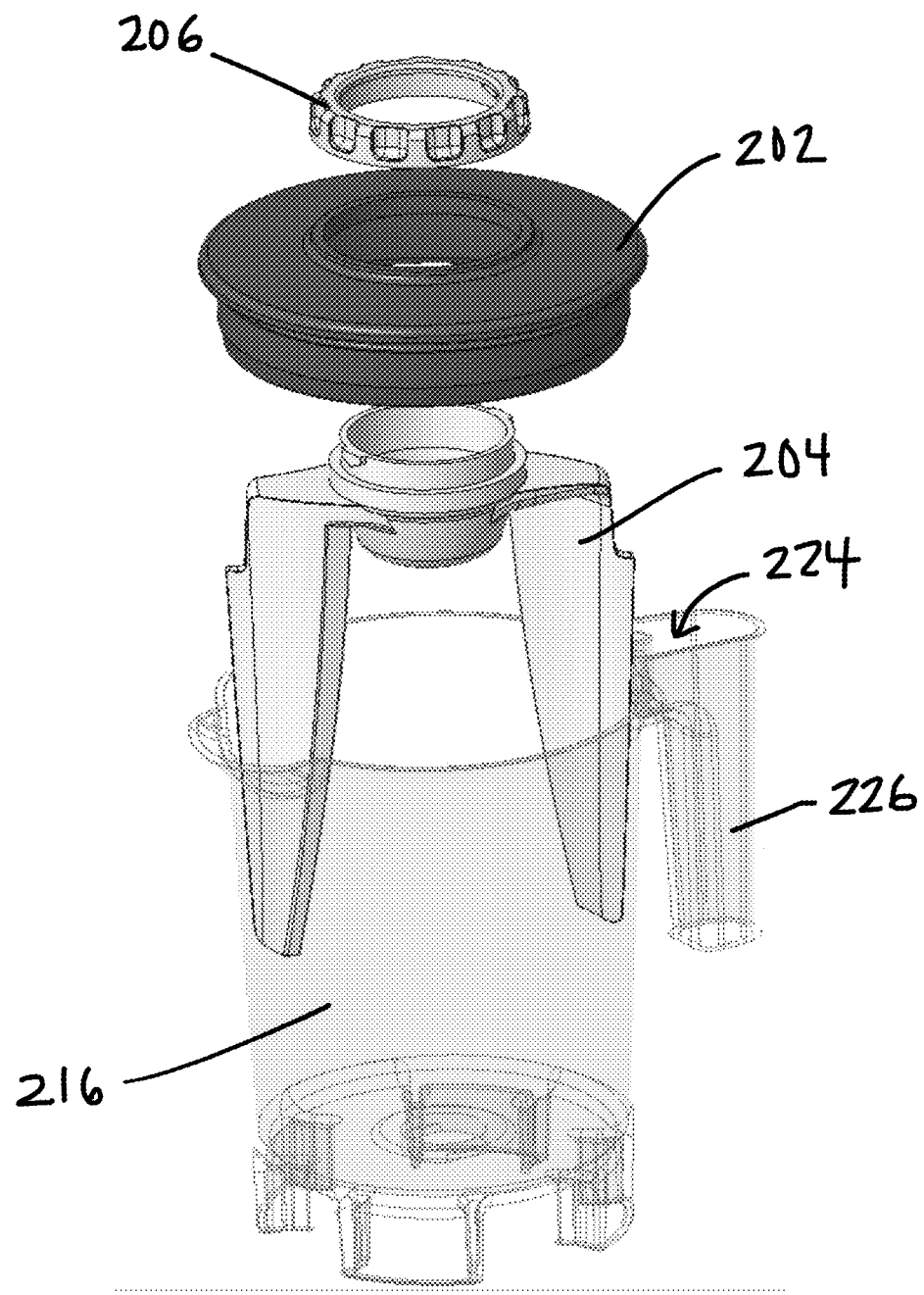
FIG. 36 is an exploded, perspective view of a portion of the motor driven dasher assembly of FIG. 32.
Figure 37:
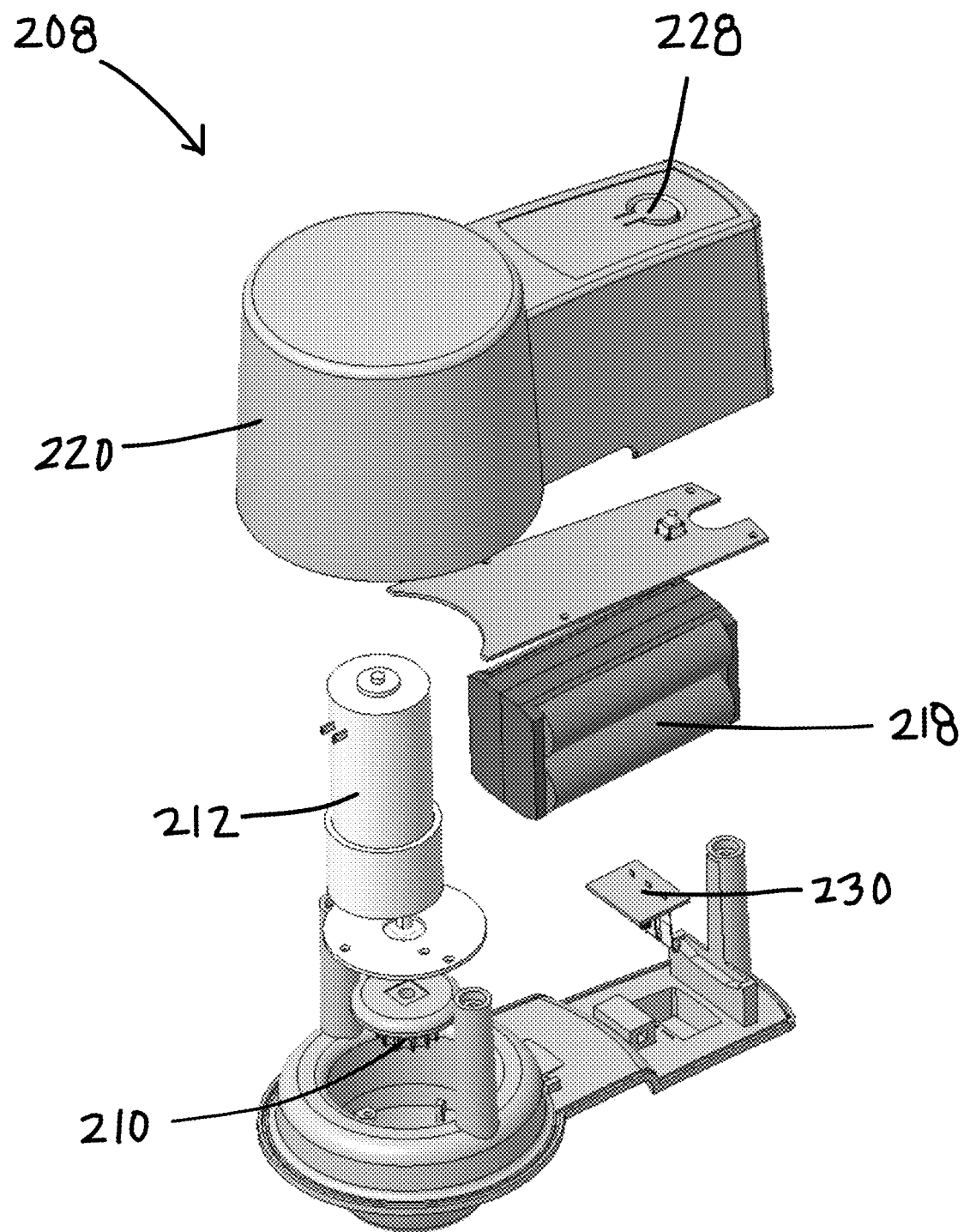
FIG. 37 is an exploded, perspective view of the motor assembly of the motor driven dasher assembly of FIG. 32.

With reference to FIGS. 32-37, a motor-driven dasher assembly 200 according to another embodiment of the present invention is shown. The dasher assembly 200 is generally similar in configuration and operation to dasher assembly 100, and includes a lid 202 for positioning atop a processing container 216, a scraper or dasher 204 that extends into the processing container 216 for scraping the interior sidewalls of the container 216, a retaining ring 206 for releasably connecting the dasher 204 to the lid 202, and a motor assembly 208 having a housing 220 containing a motor 212 drivingly connected a rotatable output shaft 210 for rotatably driving the dasher 204 (via engagement of the splined output shaft 210 with a correspondingly splined hub 214 of the dasher 204) within the container 216. As shown in FIG. 37, the motor assembly 208 includes an on-board supply of electric power for powering the motor 212 which may be, for example, one or more batteries 218. In an embodiment, the batteries may be rechargeable batteries.

As best shown in FIGS. 35 and 36 the dasher 204 is substantially similar to dasher 104 and is coupled to the lid 202 in a substantially similar manner, namely, using retaining ring 206. Notably, however, the container 216 is of the conventional type, having a single pour spout 260 and is devoid of additional recesses or spouts along the upper lip thereof. Similarly, the lid 202 is devoid of depending lugs, and instead has a substantially smooth and continuous peripheral edge. To prevent the motor assembly 208 from rotating when the motor is actuated, the housing 220 of the motor assembly 208 includes a downwardly depending projection or leg 222 that is received in an upwardly facing slot or opening 224 in the handle 226 of the container 216. This interengagement between the leg 222 and slot 224 in the handle 226 thus prevents rotation of the housing 220 when the motor 212 is actuated to drive the dasher 204.

As also shown in FIG. 37, the motor assembly 208 may have a button 228 for selectively actuating and deactivating the motor 212, allowing for user control of the scraping function. While not shown in FIGS. 32-37, the motor assembly 208 may have an interface similar to that of the motor assembly 108, allowing for more precise control of the internal sidewall scraping operation. In addition while motor assembly 208 is illustrated as being manually activated and deactivated, it is further contemplated that the motor assembly 208 may include auto start functionality (e.g., by using a transceiver) similar to that disclosed above in connection with motor assembly 108, With additional reference to FIG. 37, the motor assembly 208 includes a printed circuit board 230 with charging protection circuitry and a start switch. The PCB 230 also includes charger connection contacts for recharging of the battery 218. In an embodiment, the motor 212 is configured to drive the dasher 204 at about 90 rpm under load.

The food processing system 10 of the present invention therefore provides, in the alternative or in combination, a sound enclosure that is effective at significantly reducing noise levels created by operation of the device, and a motorized dasher or scraper assembly that can be utilized to scrape foodstuffs from the sides of the blender jar during processing, without necessitating cessation of the processing operation or removal of the blender jar lid. Importantly, by utilizing a transceiver in the dasher assembly that interacts with a reflective surface of the sound enclosure, the dasher assembly can be automatically actuated and operated while the sound enclosure is closed, without necessitating further interaction by an operator. The food processing system of the present invention therefore provides a level of performance and ease of use that has heretofore not been possible with existing devices.

While the food processing system 10 has been disclosed above as including separate means for indicating to the controller in the base that the sound enclosure is in the closed position for automatic actuation of the motor within the base (e.g., the reed switch), and for indicating to the controller in the dasher assembly that the sound enclosure is in the closed position for automatic actuation of the motor of the dasher assembly (the transceiver), the present invention is not so limited in this regard. In particular, it is contemplated that only a single means may be used to determine that the enclosure is in the closed position. In such case, case communication means (e.g., wireless communication) may be provided between the controller in the base and the controller in the dasher assembly so that both motors may be actuated in response to detection of the closed state of the sound enclosure by a single sensor. For example, a reed switch in the base may detect closure of the sound enclosure in the manner hereinbefore described. In response to the sound enclosure being in the closed position, the controller in the base may then actuate the motor in the base to commence a blending operation, and at the same time send a signal to the controller in the dasher assembly to actuate the motor in the dasher assembly to commence a scraping/ wiping operation. This would obviate the need to provide dual sensor assemblies for detecting the closed position of the enclosure.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processing system, comprising:
a processing container having a hub and a motor-driven processing blade connected to the hub, the hub and the processing blade being positioned at a bottom of the processing container, the hub being configured to matingly engage a rotatable output shaft of a base of the food processing system atop which the processing container is receivable;
a lid receivable atop the processing container; and
a motor-driven dasher assembly connected to the lid and being configured to scrape interior sidewalls of the processing container, the motor-driven dasher assembly including a motor located atop the processing container;
wherein the dasher assembly houses a non-contact mechanism for detecting when a sound enclosure of the food processing system is in a closed position encasing the processing container.

2. The food processing system of claim 1, wherein:
the dasher assembly includes a dasher having at least one scraper blade extending into the processing container, and the motor includes an output shaft drivingly connected to the dasher.

3. The food processing system of claim 2, wherein:
the lid has a central opening that receives an upper portion of the dasher there through; and
wherein the dasher assembly further includes a retaining ring engageable with the upper portion of the dasher to connect the dasher to the lid;
wherein when the retaining ring is engaged with the upper portion of the dasher, the dasher and retaining ring are rotatable relative to the lid.

4. The food processing system of claim 3, wherein:
the retaining ring and the dasher are connected to one another via a bayonet mount.

5. The food processing system of claim 1, wherein:
the processing container has a plurality of recesses formed around an upper lip of the container; and
wherein the lid includes at least one depending lug receivable within at least one of the plurality of recesses for inhibiting rotation of the lid relative to the processing container.

6. The food processing system of claim 2, wherein:
the dasher assembly includes a motor housing enclosing the motor, the motor housing including at least one hook member configured to engage a corresponding at least one keyway in the lid for securing the motor housing to the lid.

7. The food processing system of claim 6, wherein:
the motor is operable to bias the at least one hook member into engagement with the at least one keyway.

8. The food processing system of claim 1, wherein:
the mechanism includes an optical transceiver configured to emit light towards a reflective element on the sound enclosure when the sound enclosure is in the closed position, and to receive the reflected light when the sound enclosure is in the closed position.

9. The food processing system of claim 8, wherein:
the dasher assembly is configured to automatically actuate the motor to rotate the dasher when it is detected that the sound enclosure is in the closed position.

10. The food processing system of claim 9, wherein:
the dasher assembly includes an interface having a plurality of buttons including at least a first plurality of buttons corresponding to pre-programmed scraping durations, and an auto start button that, when enabled, causes the motor to rotate the dasher automatically when the sound enclosure is in the closed position.

11. The food processing system of claim 2, wherein:
the dasher assembly includes a depending leg that is configured to be received in a corresponding slot in a handle.

12. A food processing system, comprising:
a base having a motor having an output shaft rotatably driven by the motor;
a processing container receivable atop the base and having a bottom mounted blade assembly configured for operative connection with the output shaft of the motor so as to be rotatable therewith;
a lid receivable atop the processing container; and
a motor-driven dasher assembly connected to the lid, the dasher assembly including a dasher having at least one scraper blade extending into the processing container adjacent to interior sidewalls of the processing container, and a dasher motor having an output shaft drivingly connected to the dasher for rotating the at least one scraper blade with respect to the processing container, the dasher motor being separate from the motor of the base;
wherein the dasher assembly includes an interface located on the dasher assembly and having a plurality of buttons for selecting an operational mode or parameter of the dasher motor, the operational mode or parameter including at least one of a speed of the dasher motor, an operational duration of the dasher motor and/or an auto-start cycle.

13. The food processing system of claim 12, wherein:
the lid has a central opening that receives an upper portion of the dasher there through; and
wherein the dasher assembly further includes a retaining ring engageable with the upper portion of the dasher to connect the dasher to the lid;
wherein the when the retaining ring is engaged with the upper portion of the dasher, the dasher and retaining ring are rotatable relative to the lid.

14. The food processing system of claim 12, wherein:
the processing container has a plurality of recesses formed around an upper lip of the container; and
wherein the lid includes at least one depending lug receivable within at least one of the plurality of recesses for inhibiting rotation of the lid relative to the processing container.

15. The food processing system of claim 12, wherein:
the dasher assembly includes a motor housing enclosing the motor, the motor housing including at least one hook member configured to engage a corresponding at least one keyway in the lid for securing the motor housing to the lid.

16. The food processing system of claim 12, wherein:
the dasher assembly includes a non-contact mechanism for detecting when a sound enclosure of the food processing system is in a closed position encasing the processing container.

17. The food processing system of claim 16, wherein:
the mechanism includes an optical transceiver configured to emit light towards a reflective element on the sound enclosure when the sound enclosure is in the closed position, and to receive the reflected light when the sound enclosure is in the closed position.

18. The food processing system of claim 17, wherein:
the dasher assembly is configured to automatically actuate the motor to rotate the dasher when it is detected that the sound enclosure is in the closed position.

19. A method for processing food items, comprising the steps of:
connecting a dasher assembly to a lid of a processing container having a hub and a motor-driven processing blade connected to the hub, the hub being configured to matingly engage a rotatable output shaft of a base of a food processing system atop which the processing container is receivable;

positioning the lid atop the processing container such that a scraping blade of the dasher assembly extends into the processing container;

actuating a motor of the dasher assembly located atop the processing container to rotate the scraping blade with respect to the processing container;

with a non-contact detection mechanism housed in the dasher assembly, detecting a sound enclosure of the food processing system is in a closed position encasing the processing container; and in response to detecting the sound enclosure in the closed position, automatically actuating the motor of the dasher assembly.

20. The method according to claim 19, wherein:
the non-contact detection mechanism includes an optical transceiver.

\* \* \* \* \*